United States Patent
Li et al.

(10) Patent No.: US 12,279,160 B2
(45) Date of Patent: *Apr. 15, 2025

(54) ACKNOWLEDGMENT MESSAGING FOR RESOURCE RESERVATIONS

(71) Applicant: QUALCOMM Incorporated, San Diego, CA (US)

(72) Inventors: Junyi Li, Fairless Hills, PA (US); Juergen Cezanne, Ocean Township, NJ (US); Vasanthan Raghavan, West Windsor Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/888,354

(22) Filed: Aug. 15, 2022

(65) Prior Publication Data

US 2022/0394561 A1    Dec. 8, 2022

Related U.S. Application Data

(63) Continuation of application No. 16/806,809, filed on Mar. 2, 2020, now Pat. No. 11,438,808.

(Continued)

(51) Int. Cl.
*H04W 28/26*    (2009.01)
*H04L 5/00*    (2006.01)
(Continued)

(52) U.S. Cl.
CPC ........... *H04W 28/26* (2013.01); *H04L 5/0055* (2013.01); *H04W 24/08* (2013.01);
(Continued)

(58) Field of Classification Search
CPC ... H04W 28/26; H04W 72/042; H04W 88/14; H04W 52/242; H04W 24/08;
(Continued)

(56) References Cited

U.S. PATENT DOCUMENTS

| 6,137,826 A | 10/2000 | Boesch |
| 7,016,649 B1 | 3/2006 | Narasimhan et al. |

(Continued)

FOREIGN PATENT DOCUMENTS

| CN | 101341676 A | 1/2009 |
| CN | 101569112 A | 10/2009 |

(Continued)

OTHER PUBLICATIONS

3GPP TS 38.213: "3rd Generation Partnership Project; Technical Specification Group Radio Access Network; NR; Physical Layer Procedures for Control (Release 15)", 3GPP Draft, 38213-F50, 3rd Generation Partnership Project (3GPP), Mobile Competence Centre, 650, Route Des Lucioles, F-06921 Sophia-Antipolis Cedex, France, vol. RAN WG1, No. V15.5.0 (Mar. 2019), Mar. 27, 2019 (Mar. 27, 2019), 104 Pages, XP051722950, XP051686992, p. 12-p. 74, section 7.3.1.

(Continued)

*Primary Examiner* — Jung Liu
(74) *Attorney, Agent, or Firm* — Holland & Hart/QUALCOMM Incorporated

(57) ABSTRACT

Methods, systems, and devices for wireless communications are described. The described techniques may enable a first wireless device (e.g., a parent node) to transmit a control message to a second wireless device (e.g., a child node). The control message may include a resource reservation for communication with the second wireless device. The second wireless device may receive the control message and may transmit an acknowledgment message acknowledging successful reception of the resource reservation. The first wireless device may monitor for the acknowledgment message and may communicate with the second wireless device based on whether the acknowledgment message is received. For example, if the first wireless device receives feedback (Continued)

acknowledging successful reception of the resource reservation at the second wireless device, the devices may communicate data in the reserved resources. Otherwise, the first wireless device may retransmit a control message if the first control message was not successfully received.

34 Claims, 21 Drawing Sheets

Related U.S. Application Data

(60) Provisional application No. 62/835,404, filed on Apr. 17, 2019.

(51) Int. Cl.
    *H04W 24/08*     (2009.01)
    *H04W 52/24*     (2009.01)
    *H04W 72/23*     (2023.01)
    *H04W 88/14*     (2009.01)

(52) U.S. Cl.
    CPC ......... *H04W 52/242* (2013.01); *H04W 72/23* (2023.01); *H04W 88/14* (2013.01)

(58) Field of Classification Search
    CPC ............ H04W 72/0406; H04L 5/0055; H04L 5/0094; H04L 5/0044; H04L 1/1854; H04L 1/1812; H04L 1/08; H04L 5/0007; H04L 2001/0097
    See application file for complete search history.

(56) References Cited

U.S. PATENT DOCUMENTS

| | | | |
|---|---|---|---|
| 8,327,002 | B1 | 12/2012 | Van Dussen et al. |
| 9,319,886 | B2 | 4/2016 | Jo et al. |
| 9,590,707 | B1 | 3/2017 | Baik et al. |
| 9,877,322 | B1 | 1/2018 | Sung et al. |
| 10,015,691 | B2 | 7/2018 | Damnjanovic et al. |
| 10,219,182 | B1 | 2/2019 | Hahn et al. |
| 10,334,588 | B2 | 6/2019 | Sadek |
| 10,736,054 | B2 | 8/2020 | Jiang et al. |
| 11,937,193 | B2 | 3/2024 | Rico Alvarino et al. |
| 2004/0192323 | A1 | 9/2004 | Valenzuela |
| 2005/0106910 | A1 | 5/2005 | Chiu et al. |
| 2006/0285504 | A1 | 12/2006 | Dong et al. |
| 2008/0025254 | A1 | 1/2008 | Love et al. |
| 2008/0159203 | A1 | 7/2008 | Choi et al. |
| 2008/0189970 | A1 | 8/2008 | Wang et al. |
| 2008/0268786 | A1 | 10/2008 | Baker et al. |
| 2009/0028065 | A1 | 1/2009 | Iwai et al. |
| 2009/0046653 | A1 | 2/2009 | Singh et al. |
| 2009/0210474 | A1 | 8/2009 | Shao et al. |
| 2010/0040036 | A1 | 2/2010 | Ofuji et al. |
| 2010/0041413 | A1 | 2/2010 | Sumasu et al. |
| 2010/0091725 | A1 | 4/2010 | Ishii |
| 2010/0113041 | A1 | 5/2010 | Bienas et al. |
| 2010/0120360 | A1 | 5/2010 | Haustein et al. |
| 2010/0232352 | A1 | 9/2010 | Merlin et al. |
| 2010/0309803 | A1 | 12/2010 | Toh et al. |
| 2010/0329195 | A1 | 12/2010 | Abraham et al. |
| 2010/0331030 | A1 | 12/2010 | Nory et al. |
| 2011/0002227 | A1 | 1/2011 | Sampath et al. |
| 2011/0085502 | A1 | 4/2011 | Malladi et al. |
| 2011/0125488 | A1 | 5/2011 | Birmingham |
| 2011/0143800 | A1 | 6/2011 | Han et al. |
| 2011/0188598 | A1 | 8/2011 | Lee et al. |
| 2011/0249578 | A1 | 10/2011 | Nayeb Nazar et al. |
| 2011/0261742 | A1 | 10/2011 | Wentink |
| 2012/0157108 | A1 | 6/2012 | Boudreau et al. |
| 2013/0003788 | A1 | 1/2013 | Marineier et al. |
| 2013/0028228 | A1 | 1/2013 | Nakayama et al. |
| 2013/0034066 | A1 | 2/2013 | Kakishima et al. |
| 2013/0089048 | A1 | 4/2013 | Damnjanovic et al. |
| 2013/0265916 | A1 | 10/2013 | Zhu et al. |
| 2013/0288695 | A1 | 10/2013 | Okino |
| 2013/0301454 | A1 | 11/2013 | Seol et al. |
| 2014/0071954 | A1 | 3/2014 | Au et al. |
| 2014/0092865 | A1 | 4/2014 | Heo et al. |
| 2014/0098761 | A1 | 4/2014 | Lee et al. |
| 2014/0105046 | A1 | 4/2014 | Tellado et al. |
| 2014/0105136 | A1 | 4/2014 | Tellado et al. |
| 2014/0153390 | A1 | 6/2014 | Ishii et al. |
| 2014/0206382 | A1 | 7/2014 | Shabtay |
| 2014/0226551 | A1 | 8/2014 | Ouchi et al. |
| 2014/0254537 | A1 | 9/2014 | Kim et al. |
| 2014/0274141 | A1 | 9/2014 | Gholmieh et al. |
| 2014/0314000 | A1 | 10/2014 | Liu et al. |
| 2014/0362716 | A1 | 12/2014 | Zhang et al. |
| 2015/0011236 | A1 | 1/2015 | Kazmi et al. |
| 2015/0358960 | A1 | 12/2015 | Zhang et al. |
| 2015/0365939 | A1 | 12/2015 | Zhang et al. |
| 2015/0373689 | A1 | 12/2015 | Tabet et al. |
| 2016/0066301 | A1 | 3/2016 | Zhu et al. |
| 2016/0088648 | A1 | 3/2016 | Xue et al. |
| 2016/0270116 | A1 | 9/2016 | Lin et al. |
| 2016/0286450 | A1 | 9/2016 | Badic et al. |
| 2016/0295595 | A1 | 10/2016 | Chae et al. |
| 2016/0308280 | A1 | 10/2016 | Shimizu |
| 2016/0315686 | A1 | 10/2016 | Song et al. |
| 2017/0034837 | A1 | 2/2017 | Lopez-Perez et al. |
| 2017/0048772 | A1 | 2/2017 | Gheorghiu et al. |
| 2017/0064743 | A1 | 3/2017 | Lei et al. |
| 2017/0070961 | A1 | 3/2017 | Bharadwaj et al. |
| 2017/0086080 | A1 | 3/2017 | Sun et al. |
| 2017/0086137 | A1 | 3/2017 | Sun et al. |
| 2017/0093038 | A1 | 3/2017 | Li et al. |
| 2017/0215201 | A1 | 7/2017 | Kim et al. |
| 2017/0238261 | A1 | 8/2017 | Benjebbour et al. |
| 2017/0265169 | A1 | 9/2017 | Chen et al. |
| 2017/0290008 | A1 | 10/2017 | Tooher et al. |
| 2017/0310426 | A1 | 10/2017 | Fan et al. |
| 2017/0325164 | A1 | 11/2017 | Lee et al. |
| 2018/0007724 | A1 | 1/2018 | Kazmi et al. |
| 2018/0020452 | A1 | 1/2018 | Yerramalli et al. |
| 2018/0027437 | A1 | 1/2018 | Vitthaladevuni et al. |
| 2018/0042031 | A1 | 2/2018 | Hampel et al. |
| 2018/0049137 | A1 | 2/2018 | Li et al. |
| 2018/0054339 | A1 | 2/2018 | Sun et al. |
| 2018/0062770 | A1 | 3/2018 | Reial et al. |
| 2018/0092073 | A1* | 3/2018 | Nogami ................ H04W 52/16 |
| 2018/0098323 | A1 | 4/2018 | Zhang et al. |
| 2018/0124790 | A1 | 5/2018 | Yerramalli |
| 2018/0132197 | A1 | 5/2018 | Lin et al. |
| 2018/0145798 | A1* | 5/2018 | Suzuki ................ H04L 43/0864 |
| 2018/0145819 | A1 | 5/2018 | Axmon et al. |
| 2018/0160401 | A1 | 6/2018 | Goto et al. |
| 2018/0176948 | A1 | 6/2018 | Islam et al. |
| 2018/0198181 | A1 | 7/2018 | Fukasawa |
| 2018/0199341 | A1 | 7/2018 | Baldemair et al. |
| 2018/0219590 | A1 | 8/2018 | Matsuda et al. |
| 2018/0220399 | A1 | 8/2018 | Davydov et al. |
| 2018/0220465 | A1 | 8/2018 | Zhang et al. |
| 2018/0234337 | A1 | 8/2018 | Goliya et al. |
| 2018/0242264 | A1 | 8/2018 | Pelletier et al. |
| 2018/0249492 | A1 | 8/2018 | Xu et al. |
| 2018/0262288 | A1 | 9/2018 | Gao et al. |
| 2018/0309553 | A1 | 10/2018 | Cao et al. |
| 2018/0324716 | A1 | 11/2018 | Jeon et al. |
| 2018/0324853 | A1 | 11/2018 | Jeon et al. |
| 2018/0367263 | A1 | 12/2018 | Ying et al. |
| 2018/0375619 | A1 | 12/2018 | Hwang et al. |
| 2018/0376464 | A1 | 12/2018 | Hosseini et al. |
| 2019/0007181 | A1 | 1/2019 | Marinier et al. |
| 2019/0044639 | A1 | 2/2019 | Ouchi et al. |
| 2019/0044647 | A1 | 2/2019 | Tomeba et al. |
| 2019/0053072 | A1 | 2/2019 | Kundargi et al. |
| 2019/0053205 | A1 | 2/2019 | Tomeba et al. |
| 2019/0075597 | A1 | 3/2019 | Yerramalli et al. |
| 2019/0082457 | A1 | 3/2019 | Zhou et al. |
| 2019/0089498 | A1 | 3/2019 | Pelletier et al. |
| 2019/0116605 | A1 | 4/2019 | Luo et al. |

(56) References Cited

U.S. PATENT DOCUMENTS

| | | | |
|---|---|---|---|
| 2019/0182870 | A1 | 6/2019 | Shih et al. |
| 2019/0208538 | A1* | 7/2019 | Lee ............... H04W 72/23 |
| 2019/0215766 | A1 | 7/2019 | Wu et al. |
| 2019/0215896 | A1* | 7/2019 | Zhou ............... H04W 76/28 |
| 2019/0253136 | A1 | 8/2019 | Makki et al. |
| 2019/0260495 | A1 | 8/2019 | Nammi |
| 2019/0261399 | A1 | 8/2019 | Munier et al. |
| 2019/0288765 | A1 | 9/2019 | Lee et al. |
| 2019/0313406 | A1 | 10/2019 | Liu et al. |
| 2019/0327123 | A1 | 10/2019 | Wang et al. |
| 2019/0349079 | A1 | 11/2019 | Novlan et al. |
| 2020/0015209 | A1 | 1/2020 | Zhang |
| 2020/0068497 | A1 | 2/2020 | Gong et al. |
| 2020/0107335 | A1 | 4/2020 | Xue et al. |
| 2020/0107355 | A1 | 4/2020 | Zhou |
| 2020/0145860 | A1 | 5/2020 | Koskela et al. |
| 2020/0146059 | A1 | 5/2020 | Cirik et al. |
| 2020/0205083 | A1 | 6/2020 | Chen et al. |
| 2020/0288409 | A1 | 9/2020 | Li et al. |
| 2020/0296673 | A1 | 9/2020 | Ouchi et al. |
| 2020/0328850 | A1 | 10/2020 | Feng |
| 2020/0336920 | A1 | 10/2020 | Li et al. |
| 2020/0336942 | A1 | 10/2020 | Li et al. |
| 2020/0336946 | A1 | 10/2020 | Li et al. |
| 2020/0336994 | A1 | 10/2020 | Li et al. |
| 2020/0337004 | A1 | 10/2020 | Li et al. |
| 2020/0337028 | A1 | 10/2020 | Li et al. |
| 2021/0022091 | A1 | 1/2021 | Li et al. |
| 2021/0037441 | A1 | 2/2021 | Khalid et al. |
| 2021/0045076 | A1 | 2/2021 | Tomeba et al. |
| 2021/0084693 | A1 | 3/2021 | Zhang et al. |
| 2021/0136639 | A1 | 5/2021 | Osawa |
| 2021/0143959 | A1 | 5/2021 | Xu et al. |
| 2021/0168782 | A1 | 6/2021 | Hamidi-Sepehr et al. |
| 2021/0195674 | A1 | 6/2021 | Park et al. |
| 2021/0204307 | A1 | 7/2021 | Lee et al. |
| 2021/0235386 | A1 | 7/2021 | Zhang et al. |
| 2021/0314892 | A1 | 10/2021 | Rico Alvarino et al. |
| 2021/0410084 | A1 | 12/2021 | Li et al. |
| 2022/0174694 | A1 | 6/2022 | Hwang et al. |
| 2023/0027300 | A1 | 1/2023 | Li et al. |
| 2023/0052171 | A1 | 2/2023 | Li et al. |
| 2023/0069736 | A1 | 3/2023 | Li et al. |
| 2023/0085790 | A1 | 3/2023 | Li et al. |
| 2023/0147731 | A1 | 5/2023 | Li et al. |
| 2023/0247577 | A1 | 8/2023 | Rico Alvarino et al. |
| 2024/0015757 | A1 | 1/2024 | Li et al. |

FOREIGN PATENT DOCUMENTS

| | | |
|---|---|---|
| CN | 102792625 A | 11/2012 |
| CN | 103220702 A | 7/2013 |
| CN | 105052068 A | 11/2015 |
| CN | 105103467 A | 11/2015 |
| CN | 106688193 A | 5/2017 |
| CN | 107113902 A | 8/2017 |
| CN | 108028743 A | 5/2018 |
| CN | 108781103 A | 11/2018 |
| EP | 1515471 A1 | 3/2005 |
| EP | 1641188 A1 | 3/2006 |
| EP | 2120364 A1 | 11/2009 |
| EP | 2504942 A1 | 10/2012 |
| EP | 3179660 A1 | 6/2017 |
| KR | 20180136855 A | 12/2018 |
| WO | WO-2015089253 A2 | 6/2015 |
| WO | WO2016040290 A1 | 3/2016 |
| WO | WO-2016061382 | 4/2016 |
| WO | WO-2017040002 A1 | 3/2017 |
| WO | WO-2019032799 A1 | 2/2019 |
| WO | WO2019070579 A1 | 4/2019 |
| WO | WO-2019102065 A1 | 5/2019 |

OTHER PUBLICATIONS

AT&T: "Enhancements to Support NR Backhaul Links," 3GPP Draft, 3GPP TSG RAN WG1 Meeting #94bis, R1-1810690, 3rd Generation Partnership Project (3GPP), Mobile Competence Centre, 650, Route Des Lucioles, F-06921, Sophia-Antipolis Cedex, France, vol. RAN WG1, No. Chengdu, China, Oct. 8, 2018-Oct. 12, 2018, Sep. 29, 2018 (Sep. 29, 2018), XP051518094, 15 pages, Retrieved from the Internet: URL: http://www.3gpp.org/ftp/tsg_ran/WG1_RL1/TSGR1_94b/Docs/R1-1810690.zip [retrieved on Sep. 29, 2018] Chapter 2.3 "Frame Structure Design and Backhaul Multiplexing".

Huawei, et al., "Physical Layer Enhancement on IAB", 3GPP TSG-RAN WG1 Meeting #92bis, 3GPP Draft; R1-1803695, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, Apr. 15, 2018 (Apr. 15, 2018), 6 Pages, XP051425992, Retrieved from the Internet: URL: http://www.3gpp.org/ftp/Meetings%5F3GPP%5FSYNC/RAN1/Docs/ [retrieved on Apr. 15, 2018] Sections 2.1 and 2.2.

International Preliminary Report on Patentability—PCT/US2020/020825, The International Bureau of WIPO—Geneva, Switzerland, dated Sep. 16, 2021.

International Preliminary Report on Patentability—PCT/US2020/020795 The International Bureau of WIPO—Geneva, Switzerland, dated Oct. 28, 2021.

International Preliminary Report on Patentability—PCT/US2020/020808 The International Bureau of WIPO—Geneva, Switzerland, dated Oct. 28, 2021.

International Preliminary Report on Patentability—PCT/US2020/020816 The International Bureau of WIPO—Geneva, Switzerland, dated Oct. 28, 2021.

International Preliminary Report on Patentability—PCT/US2020/020818 The International Bureau of WIPO—Geneva, Switzerland, dated Oct. 28, 2021.

International Preliminary Report on Patentability—PCT/US2020/020828 The International Bureau of WIPO—Geneva, Switzerland, dated Oct. 28, 2021.

International Preliminary Report on Patentability—PCT/US2020/020829 The International Bureau of WIPO—Geneva, Switzerland, dated Oct. 28, 2021.

International Search Report and Written Opinion—PCT/US2020/020825—ISAEPO—dated Jun. 17, 2020.

International Search Report and Written Opinion—PCT/US2020/020795—ISAEPO—dated Jun. 2, 2020.

International Search Report and Written Opinion—PCT/US2020/020816—ISAEPO—dated Aug. 3, 2020.

International Search Report and Written Opinion—PCT/US2020/020818—ISA/EPO—dated Jun. 8, 2020.

International Search Report and Written Opinion—PCT/US2020/020828—ISAEPO—dated May 29, 2020.

International Search Report and Written Opinion—PCT/US2020/020808—ISA/EPO—dated May 29, 2020.

International Search Report and Written Opinion—PCT/US2020/020829—ISA/EPO—dated Jun. 19, 2020.

LG Electronics: "Discussions on Mechanisms to Support NR IAB Scenarios", 3GPP Draft, 3GPP TSG RAN WG1 Meeting #94bis, R1-1810273, Discussions on NR IAB Support_V0, 3rd Generation Partnership Project, (3gpp), Mobile Competence Centre, 650, Route Des Lucioles, F-06921, Sophia-Antipolis Cedex, France, vol. RAN WG1, No. Chengdu, China, Oct. 8, 2018-Oct. 12, 2018, Sep. 29, 2018 (Sep. 29, 2018), XP051517687, 7 pages, Retrieved from the Internet: URL: http://www.3gpp.org/ftp/tsg%5Fran/WG1%5FRL1/TSGR1%5F94b/Docs/R1%2D1810273%2Ezip, [retrieved on Sep. 29, 2018] Chapter 6 "Access and Backhaul Timing" Chapter 7 "TDM Patterns", Paragraph [0007].

Partial International Search Report—PCT/US2020/020816—ISA/EPO—dated Jun. 12, 2020.

Qualcomm Incorporated: "Inter-IAB-Node Discovery", 3GPP Draft, 3GPP TSG RAN WG1 Meeting #93, R1-1807395, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 12,

(56) References Cited

OTHER PUBLICATIONS 2018 (May 12, 2018), XP051463086, 8 Pages, Retrieved from the Internet: URL: http://www.3gpp.org/ftp/tsg%5Fran/WG1%5FRL1/TSGR1%5F93/Docs, [retrieved on May 12, 2018], paragraph [0003].
Qualcomm Incorporated: "Resource Allocation for PUCCH", 3GPP Draft, 3GPP TSG RAN WG1 Meeting #90b, R1-1718806 Resource Allocation for PUCCH, 3rd Generation Partnership Project (3GPP), Mobile Competence Centre, 650, Route Des Lucioles, F-06921 Sophia-Antipolis Cedex, France, vol. RAN WG1, No. Prague, CZ, Oct. 9, 2017-Oct. 13, 2017, Oct. 8, 2017, XP051341951, 10 Pages, Retrieved from the Internet: URL: http://www.3gpp.org/ftp/Meetings_3GPP_SYNC/RAN1/Docs/, [retrieved on Oct. 8, 2017], paragraph [0002].
Spreadtrum Communications: "On RS Multiplexing", 3GPP TSG RAN WG1 Meeting #90, R1-1713051_On RS Multiplexing_Final, 3rd Generation Partnership Project, Mobile Competence Centre, 650, Route Des Lucioles, F-06921 Sophia-Antipolis Cedex, France, vol. RAN WG1, No. Prague, Czech Rep, Aug. 21, 2017-Aug. 25, 2017, Aug. 20, 2017, XP051315860, 8 Pages, Sections 4-5.

\* cited by examiner

ACKNOWLEDGMENT MESSAGING FOR RESOURCE RESERVATIONS

CROSS REFERENCE

The present application for patent is a Continuation of U.S. patent application Ser. No. 16/806,809 by LI et al., entitled "ACKNOWLEDGEMENT MESSAGING FOR RESOURCE RESERVATIONS" filed Mar. 2, 2020, which claims the benefit of U.S. Provisional Patent Application No. 62/835,404 by LI et al., entitled "ACKNOWLEDGMENT MESSAGING FOR RESOURCE RESERVATIONS," filed Apr. 17, 2019, assigned to the assignee hereof, and expressly incorporated by reference herein.

INTRODUCTION

The following relates generally to wireless communications, and more specifically to control channel signaling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method for wireless communications at a first wireless device is described. The method may include transmitting, to a second wireless device, a control message on a physical downlink control channel (PDCCH), where the control message includes a resource reservation for communication with the second wireless device, monitoring a physical uplink control channel (PUCCH) for an acknowledgment message acknowledging successful reception of the resource reservation at the second wireless device, and communicating with the second wireless device based on whether the acknowledgment message is received.

An apparatus for wireless communications at a first wireless device is described. The apparatus may include a processor, memory coupled to the processor, the processor and memory configured to transmit, to a second wireless device, a control message on a PDCCH, where the control message includes a resource reservation for communication with the second wireless device, monitor a PUCCH for an acknowledgment message acknowledging successful reception of the resource reservation at the second wireless device, and communicate with the second wireless device based on whether the acknowledgment message is received.

Another apparatus for wireless communications at a first wireless device is described. The apparatus may include means for transmitting, to a second wireless device, a control message on a PDCCH, where the control message includes a resource reservation for communication with the second wireless device, monitoring a PUCCH for an acknowledgment message acknowledging successful reception of the resource reservation at the second wireless device, and communicating with the second wireless device based on whether the acknowledgment message is received.

A non-transitory computer-readable medium storing code for wireless communications at a first wireless device is described. The code may include instructions executable by a processor to transmit, to a second wireless device, a control message on a PDCCH, where the control message includes a resource reservation for communication with the second wireless device, monitor a PUCCH for an acknowledgment message acknowledging successful reception of the resource reservation at the second wireless device, and communicate with the second wireless device based on whether the acknowledgment message is received.

Some examples of the method, apparatuses, and non-transitory computer-readable medium described herein may further include operations, features, means, or instructions for identifying an absence of the acknowledgment message within a monitoring window based on the monitoring.

In some examples of the method, apparatuses, and non-transitory computer-readable medium described herein, the communicating may include operations, features, means, or instructions for transmitting, to the second wireless device, an additional control message on the PDCCH based on the identifying the absence of the acknowledgment message, where the additional control message includes an additional resource reservation for communication with the second wireless device.

In some examples of the method, apparatuses, and non-transitory computer-readable medium described herein, the resource reservation may reserve a downlink resource on a physical downlink shared channel (PDSCH). Some examples of the method, apparatuses, and non-transitory computer-readable medium described herein may further include operations, features, means, or instructions for receiving the acknowledgment message in response to the control message based on the monitoring, where the communicating includes transmitting, to the second wireless device, a data message in the reserved downlink resource on the PDSCH.

In some examples of the method, apparatuses, and non-transitory computer-readable medium described herein, the resource reservation may reserve an uplink resource on a physical uplink shared channel (PUSCH). Some examples of the method, apparatuses, and non-transitory computer-readable medium described herein may further include operations, features, means, or instructions for receiving the acknowledgment message in response to the control message based on the monitoring, where the communicating includes receiving, from the second wireless device, a data message in the reserved uplink resource on the PUSCH.

In some examples of the method, apparatuses, and non-transitory computer-readable medium described herein, the monitoring may include operations, features, means, or instructions for monitoring for the acknowledgment message in a monitoring window between a first resource in which the control message may be transmitted and a reserved resource corresponding to the resource reservation.

Some examples of the method, apparatuses, and non-transitory computer-readable medium described herein may further include operations, features, means, or instructions for determining a starting point of the monitoring window, an ending point of the monitoring window, or both based on a configuration of the first wireless device.

Some examples of the method, apparatuses, and non-transitory computer-readable medium described herein may further include operations, features, means, or instructions for identifying that a first mode may be activated, where the monitoring may be based on the activated first mode. In some examples, the first mode may include a high pathloss mode.

In some examples of the method, apparatuses, and non-transitory computer-readable medium described herein, the control message may be transmitted in a first resource separated in time from a reserved resource corresponding to the resource reservation by a first time gap. Some examples of the method, apparatuses, and non-transitory computer-readable medium described herein may further include operations, features, means, or instructions for deactivating the first mode based on a measurement, and transmitting, to the second wireless device, an additional control message in a second resource on the PDCCH, where the additional control message includes an additional resource reservation reserving an additional reserved resource separated in time from the second resource by a second time gap shorter than the first time gap based on the deactivated first mode.

In some examples of the method, apparatuses, and non-transitory computer-readable medium described herein, the control message indicates an acknowledgment resource for receiving the acknowledgment message.

A method for wireless communications at a first wireless device is described. The method may include receiving, from a second wireless device, a control message on a PDCCH, where the control message includes a resource reservation for communication with the second wireless device, transmitting, to the second wireless device, an acknowledgment message on a PUCCH, where the acknowledgment message acknowledges successful reception of the resource reservation at the first wireless device, and communicating with the second wireless device based on the resource reservation.

An apparatus for wireless communications at a first wireless device is described. The apparatus may include a processor, memory coupled to the processor, the processor and memory configured to receive, from a second wireless device, a control message on a PDCCH, where the control message includes a resource reservation for communication with the second wireless device, transmit, to the second wireless device, an acknowledgment message on a PUCCH, where the acknowledgment message acknowledges successful reception of the resource reservation at the first wireless device, and communicate with the second wireless device based on the resource reservation.

Another apparatus for wireless communications at a first wireless device is described. The apparatus may include means for receiving, from a second wireless device, a control message on a PDCCH, where the control message includes a resource reservation for communication with the second wireless device, transmitting, to the second wireless device, an acknowledgment message on a PUCCH, where the acknowledgment message acknowledges successful reception of the resource reservation at the first wireless device, and communicating with the second wireless device based on the resource reservation.

A non-transitory computer-readable medium storing code for wireless communications at a first wireless device is described. The code may include instructions executable by a processor to receive, from a second wireless device, a control message on a PDCCH, where the control message includes a resource reservation for communication with the second wireless device, transmit, to the second wireless device, an acknowledgment message on a PUCCH, where the acknowledgment message acknowledges successful reception of the resource reservation at the first wireless device, and communicate with the second wireless device based on the resource reservation.

In some examples of the method, apparatuses, and non-transitory computer-readable medium described herein, the resource reservation may reserve a downlink resource on a PDSCH. Some examples of the method, apparatuses, and non-transitory computer-readable medium described herein may further include operations, features, means, or instructions for receiving, from the second wireless device, a data message in the reserved downlink resource on the PDSCH.

In some examples of the method, apparatuses, and non-transitory computer-readable medium described herein, the resource reservation may reserve an uplink resource on a PUSCH. Some examples of the method, apparatuses, and non-transitory computer-readable medium described herein may further include operations, features, means, or instructions for transmitting, to the second wireless device, a data message in the reserved uplink resource on the PUSCH.

Some examples of the method, apparatuses, and non-transitory computer-readable medium described herein may further include operations, features, means, or instructions for identifying that a first mode may be activated, where the transmitting the acknowledgment message may be based on the activated first mode. In some examples, the first mode may include a high pathloss mode.

Some examples of the method, apparatuses, and non-transitory computer-readable medium described herein may further include operations, features, means, or instructions for deactivating the high pathloss mode based on a measurement, receiving, from the second wireless device, an additional control message on the PDCCH, where the additional control message includes an additional resource reservation for communication with the second wireless device, and communicating with the second wireless device based on the additional resource reservation.

In some examples of the method, apparatuses, and non-transitory computer-readable medium described herein, the transmitting the acknowledgment message may include operations, features, means, or instructions for transmitting the acknowledgment message in an acknowledgment resource subsequent to a first resource in which the control message may be received and prior to a reserved resource corresponding to the resource reservation.

Some examples of the method, apparatuses, and non-transitory computer-readable medium described herein may further include operations, features, means, or instructions for determining the acknowledgment resource based on the first resource in which the control message may be received or the reserved resource corresponding to the resource reservation or both.

Some examples of the method, apparatuses, and non-transitory computer-readable medium described herein may further include operations, features, means, or instructions for determining the acknowledgment resource based on an acknowledgment resource allocation in the control message.

DETAILED DESCRIPTION

Figure 1:
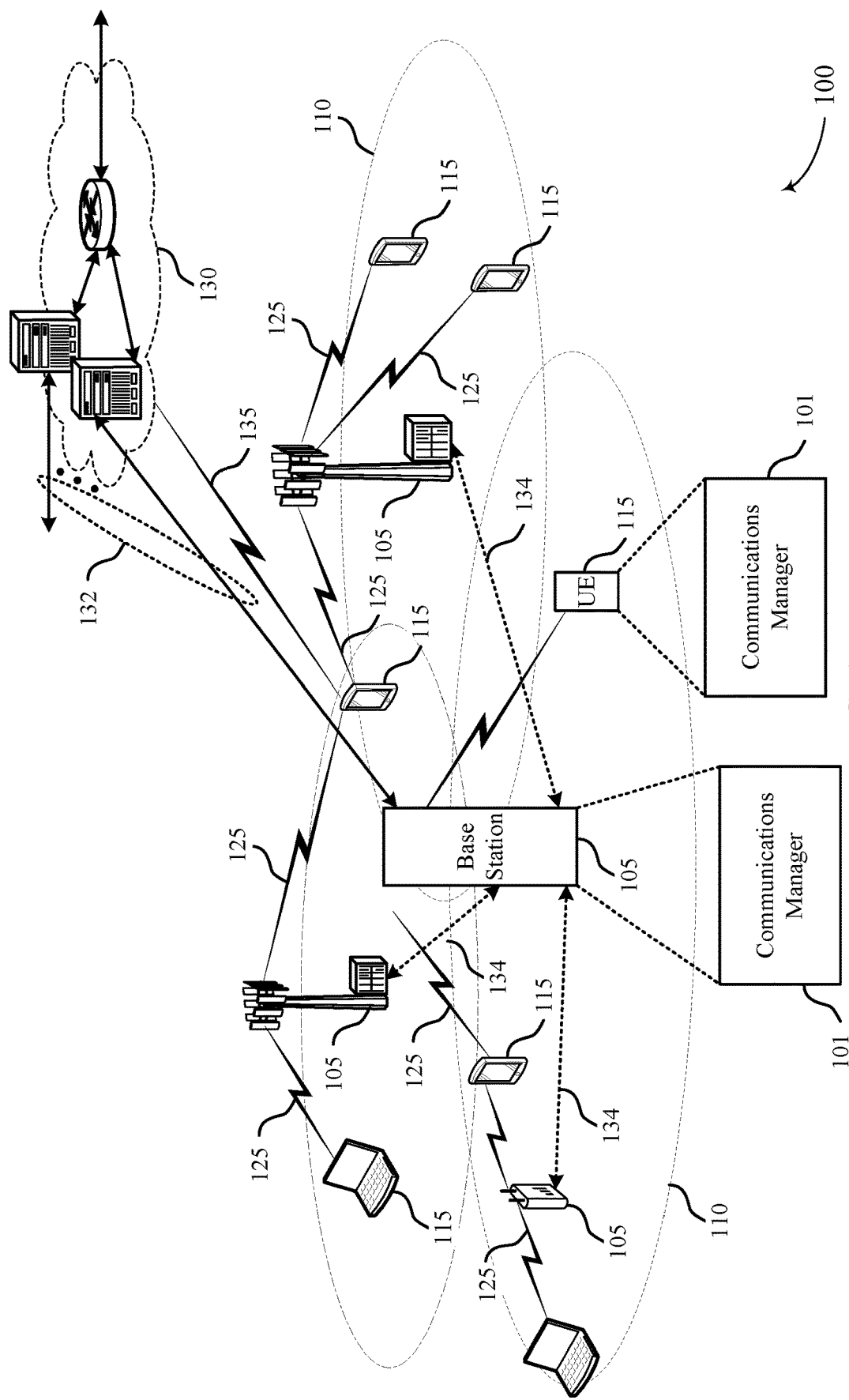
FIGS. 1-3 illustrate examples of wireless communications systems that support acknowledgment messaging for resource reservations in accordance with one or more aspects of the present disclosure.

Wireless communications systems may operate in millimeter wave (mmW) frequency ranges, such as 28 gigahertz (GHz), 40 GHz, 60 GHz, etc. Wireless communications at these frequencies may be associated with increased signal attenuation (e.g., pathloss), which may be influenced by various factors, such as temperature, barometric pressure, diffraction, blockage, etc. As a result, signal processing techniques, such as beamforming, may be used to coherently combine energy and overcome the pathlosses at these frequencies. Due to the increased amount of pathloss in mmW communication systems, transmissions from a base station and/or a UE may be beamformed. Moreover, a receiving device may use beamforming techniques to configure antennas and/or antenna arrays such that transmissions are received in a directional manner.

Some wireless communications systems may include base stations (e.g., access nodes (ANs)) to facilitate wireless communication between a UE and the network. In some cases, an anchor node may have a high-capacity, wired, backhaul connection (e.g., fiber) to the network, while communicating with one or more nodes (e.g., relay devices, such as base stations) or UEs, which may be referred to as child nodes. In some examples, an anchor node may be referred to as an integrated access and backhaul (IAB) donor node or a parent node. A network that supports communications between a base station and a UE may be referred to as an access network, while a network that supports communications between multiple base stations may be referred to as a backhaul network. Some wireless communications systems may support both an access network and a backhaul network in an IAB network. In some deployments, the network may experience high pathloss due to blocking, interference, etc., such that the wireless communications may fail. For example, a child node may fail to receive control information from a parent node, such as a resource reservation for a data transmission. This may lead to high overhead, significant latency, and inefficient signaling in the system.

Some techniques described herein may provide a mechanism to respond to changes in pathloss measurements. That is, such techniques may provide various mechanisms for maintaining a link budget in a challenging pathloss environment. For example, a parent node and/or a child node in an IAB system may determine that a pathloss measurement exceeds a threshold value and may determine to operate in a high pathloss mode. In some examples, the transmission duration of signals such as control channel transmissions, data channel transmissions, or both may be increased in the high pathloss mode (e.g., as compared to a normal operating mode) to support lower coding rates, more redundancy, etc. Increasing the duration of such signals may enable more reliable communications between devices.

However, in some cases in this high pathloss mode, control information may be lost, resulting in increased latency. For example, a parent node may transmit, to one or more child nodes, control information reserving resources for a data transmission. If a child node fails to receive or decode the control information (e.g., due to the high pathloss, interference, blocking, etc.), the child node may be unaware of the allocated resources to transmit or receive the data, which may result in inefficient signaling and performance loss. For example, the parent node may transmit or monitor for the data transmission despite the child node being unable to monitor for or transmit the data transmission due to the missed control information (e.g., the lost resource reservation). In some examples, the parent node may determine that the control information was lost after monitoring for feedback to the data transmission, which may utilize significant overhead and result in increased latency (e.g., in a wireless communications system with relatively long transmission times, such as a system supporting devices in a high pathloss mode).

Aspects of the described techniques provide various mechanisms for providing acknowledgment signaling for resource reservations. Such techniques may enable the parent node to more quickly detect lost control information, which may result in more efficient signaling. For example, the parent node may transmit control information indicating a resource reservation for a data transmission. The control information may also include an indication to one or more child nodes to transmit feedback (e.g., an acknowledgment message) for the control information. A child node may transmit the feedback (e.g., the acknowledgment message) if the child node successfully receives the control information and identifies the resource(s) reserved for the one or more data transmissions. Such feedback to the parent node may enable the parent node to implement more efficient signaling and reduce overhead and latency. For example, the techniques may enable the parent node to determine that a resource reservation was not successfully received by a child node relatively quickly (e.g., before transmitting or monitoring for a corresponding data transmission). The parent node may determine to refrain from transmitting or monitoring for the relatively long data transmission associated with the resource reservation if an acknowledgment message is not received from the child node. Instead, the parent node may transmit additional control information (e.g., including an additional resource reservation for the data transmissions) to reschedule the data transmission. Retransmitting a resource reservation based on not receiving an acknowledgment for the first resource reservation may reduce signaling latency and lower the signaling overhead for the parent node.

Aspects of the disclosure are initially described in the context of wireless communications systems. Aspects of the disclosure are also illustrated by resource mappings and process flows for acknowledgment messaging for resource reservations. Aspects of the disclosure are further illustrated by and described with reference to apparatus diagrams, system diagrams, and flowcharts that relate to acknowledgment messaging for resource reservations.

FIG. 1 illustrates an example of a wireless communications system 100 that supports acknowledgment messaging for resource reservations in accordance with one or more aspects of the present disclosure. The wireless communications system 100 includes base stations 105, UEs 115, and a core network 130. In some examples, the wireless communications system 100 may be an LTE network, an LTE-A network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions. A UE 115 may communicate with the core network 130 through communication link 135.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous or overlapping communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some examples, the wireless communications system 100 may implement acknowledgment messaging for resource reservations. For example, a parent node, which may be an example of a base station 105, may transmit control information (e.g., including a resource reservation for one or more data transmissions) to one or more child nodes (e.g., another base station 105 or a UE 115). The control information may indicate to the child nodes to transmit feedback (e.g., an acknowledgment message) for the transmitted control information and the resource reservation.

One or more of the base stations 105 or the UEs 115 may include a communications manager 101, which may receive, from a second wireless device, a control message on a PDCCH, where the control message includes a resource reservation for communication with the second wireless device, transmit, to the second wireless device, an acknowledgment message on a PUCCH, where the acknowledgment message acknowledges successful reception of the resource reservation at the first wireless device, and communicate with the second wireless device based on the resource reservation. The communications manager 101 may additionally or alternatively transmit, to a second wireless device, a control message on a PDCCH, where the control message includes a resource reservation for communication with the second wireless device, monitor a PUCCH for an acknowledgment message acknowledging successful reception of the resource reservation at the second wireless device, and communicate with the second wireless device based on whether the acknowledgment message is received.

Figure 2:
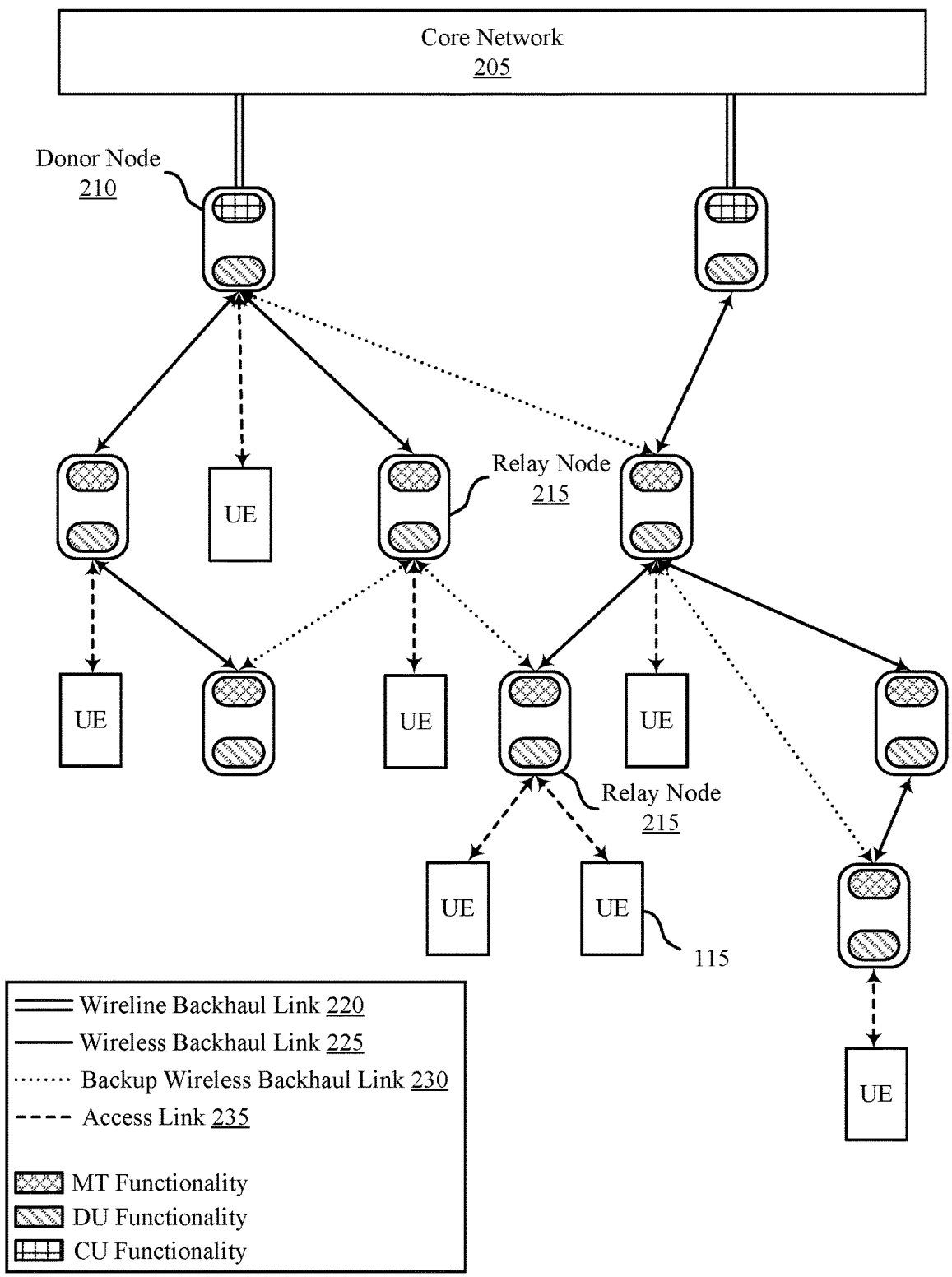

FIG. 2 illustrates an example of a wireless communications system 200 that supports acknowledgment messaging for resource reservations in accordance with one or more aspects of the present disclosure. Wireless communications system 200 (e.g., an NR system, an mmW system, etc.) may supplement wireline backhaul connections (e.g., wireline backhaul links 220) by sharing infrastructure and spectral resources for network access with wireless backhaul link capabilities, providing an IAB network architecture. Wireless communications system 200 may include a core network 205 and base stations 105 or supported devices split into one or more support entities (i.e., functionalities) for promoting wireless backhaul density in collaboration with communication access. Aspects of the supporting functionalities of the base stations 105 may be referred to as IAB nodes, such as IAB donor nodes 210 and IAB relay nodes 215. Wireless communications system 200 may additionally support a number of UEs 115, which may communicate on the uplink with one or more IAB donor nodes 210, IAB relay nodes 215, or a combination of these devices. In some examples, wireless communications system 200 may implement aspects of wireless communications system 100.

Wireless communications system 200 may include one or more IAB donor nodes 210, which may interface between a wireline network and a wireless network. In some cases, an IAB donor node 210 may be referred to as an anchor node, as the IAB donor node 210 anchors the wireless network to a wireline connection. For example, each IAB donor node 210 may include at least one wireline backhaul link 220 and one or more additional links (e.g., wireless backhaul links 225, backup wireless backhaul links 230, access links 235, etc.). An IAB donor node 210 may be split into associated base station centralized unit (CU) and distributed unit (DU) entities, where one or more DUs associated with an IAB donor node 210 may be partially controlled by an associated CU. CUs of IAB donor nodes 210 may host layer 3 (L3) (e.g., radio resource control (RRC), service data adaption protocol (SDAP), packet data convergence protocol (PDCP), etc.) functionality and signaling. Furthermore, CUs of IAB donor nodes 210 may communicate with the core network 205 over a wireline backhaul link 220 (e.g., which may be referred to as an NG interface). DUs may host lower layer operations, such as layer 1 (L1) and/or layer 2 (L2) (e.g., radio link control (RLC), MAC, physical (PHY) layer, etc.) functionality and signaling. A DU entity of an IAB donor node 210 may support a serving cell within the network coverage area according to connections associated with wireless backhaul links 225 and access links 235 of the IAB network. DUs of the IAB donor nodes 210 may control both access and backhaul links within the corresponding network coverage and may provide controlling and scheduling for descendant (i.e., child) IAB relay nodes 215 and/or UEs 115. For example, a DU may support an RLC channel connection with a UE 115 (e.g., via an access link 235) or with an IAB relay node 215 (e.g. via a backhaul link, such as a primary wireless backhaul link 225 or a backup wireless backhaul link 230).

TAB relay nodes 215 may be split into associated mobile terminal (MT) and base station DU entities, where MT functionality of the IAB relay nodes 215 may be controlled and/or scheduled by antecedent (i.e., parent) IAB nodes via wireless backhaul links. A parent node to a relay node 215 (i.e., a child node) may be another (antecedent) relay node 215 or a donor node 210. The MT functionality may be similar to functionality performed by UEs 115 in the system.

An IAB relay node 215 may not be directly connected to a wireline backhaul 220. Instead, the IAB relay node 215 may connect to the core network 205 via other IAB nodes (e.g., any number of additional IAB relay nodes 215 and an IAB donor node 210) using wireless backhaul links. The IAB relay node 215 may transmit upstream (e.g., towards the core network 205) in the IAB system using MT functionality. In some cases, DUs of the IAB relay nodes 215 may be partially controlled by signaling messages from CU entities of an associated IAB donor node 210 (e.g., transmitted via an F1-application protocol (AP)). The DUs of the IAB relay nodes 215 may support serving cells of the network coverage area. For example, a DU of an IAB relay node 215 may perform the same or similar functions as a DU of an IAB donor node 210, supporting one or more access links 235 for UEs 115, one or more wireless backhaul links for downstream IAB relay nodes 215, or both.

Wireless communications system 200 may employ relay chains for communications within the IAB network architecture. For example, a UE 115 may communicate with an IAB node, and the IAB node may relay the data to a base station CU (e.g., a network entity or network device) or the core network 205 either directly or via one or more IAB relay nodes 215. Each IAB relay node 215 may include a primary wireless backhaul link 225 for relaying data upstream and/or receiving information from a base station CU or the core network 205. In some cases, an IAB relay node 215 may additionally include one or more backup wireless backhaul links 230 (e.g., for redundant connectivity and/or improved robustness). If the primary wireless backhaul link 225 fails (e.g., due to interference, malfunction at a connected IAB node, movement of IAB nodes, maintenance at IAB nodes, etc.), an IAB relay node 215 may utilize a backup wireless backhaul link 230 for backhaul communication within the IAB network. The first (e.g., primary) wireless backhaul link 225 may be associated with a coverage area and MT functionality may be controlled and/or scheduled by a first parent node. The one or more secondary backhaul links (e.g., backup wireless backhaul links 230) may be associated with a non-collocated coverage area and controlled and/or scheduled by one or more parent nodes. Each of the primary backhaul connections and the one or more secondary connections may support spectral capabilities to provide network communication over one or more RATs. The one or more IAB nodes may further support base station DU entities and may support multiple backhaul and access links within the relay chain. The DU entities may control and/or schedule descendant IAB relay nodes 215 and UEs 115 within the IAB network (e.g., downstream in the IAB network) via the configured backhaul and access links. That is, an IAB relay node 215 may act as a relay between an IAB donor node 210 and one or more descendant devices (e.g., other IAB relay nodes 215, UEs 115, etc.) in both communication directions based on established backhaul and access connections.

The operations performed by the wireless devices in the wireless communications system 200 may be static or dynamic. For example, in a dynamic IAB system, a wireless device may function as a donor node 210, a relay node 215, a parent node, a child node, or any combination of these. In some cases, wireless devices may dynamically switch between the different roles in the IAB system (e.g., based on configurations, channel conditions, neighboring devices, etc.). In other cases, wireless devices may function in multiple different roles at the same time (e.g., a single wireless device, such as a base station 105 or UE 115, may act as a parent node for one wireless device and a child node for another wireless device). In some aspects, the wireless devices of wireless communication system 200 may utilize aspects of the described techniques to transmit or receive feedback for a control message (e.g., a control channel transmission including a resource reservation).

Figure 3:
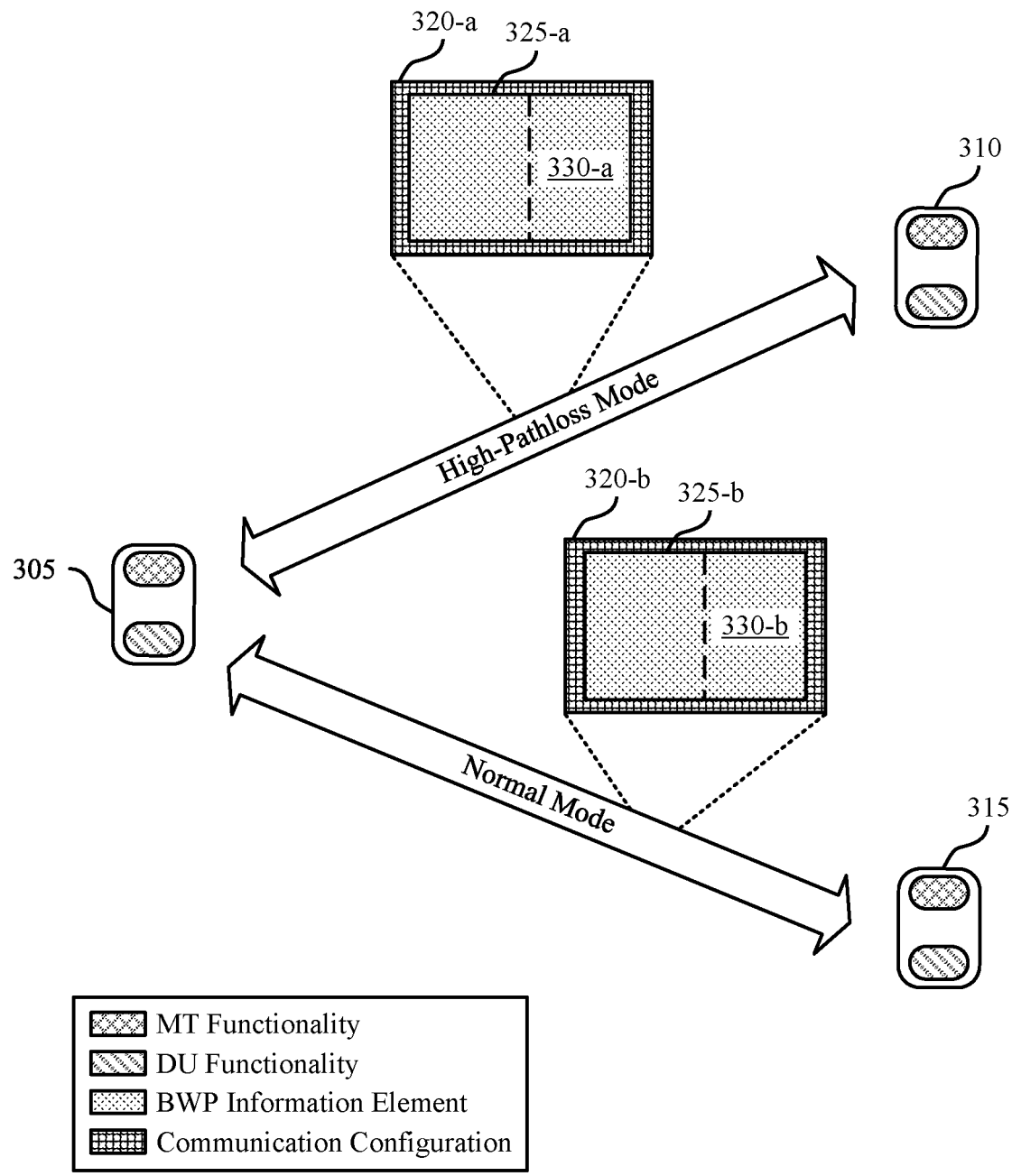

FIG. 3 illustrates an example of a wireless communications system 300 that supports acknowledgment messaging for resource reservations in accordance with one or more aspects of the present disclosure. In some examples, wireless communications system 300 may implement aspects of wireless communications systems 100 or 200. In some aspects, wireless communications system 300 may operate within an IAB network. For example, IAB nodes 305, 310, and 315 may be nodes within a larger IAB network, and IAB node 305 may communicate with IAB node 310 or IAB node 315 over wireless or wired backhaul links. IAB nodes 305, 310, and 315 may be examples of wireless devices, relay nodes, donor nodes, or IAB nodes as described herein.

Aspects of the described techniques enable support for wireless communications over a radio frequency spectrum band in a high pathloss environment by utilizing a high pathloss mode. The high pathloss mode may utilize various parameters (e.g., modulation and coding scheme (MCS), HARQ, aggregation level, reference signals, etc.) that are configured or otherwise selected to support wireless communications over the radio frequency spectrum band experiencing a pathloss that satisfies (or exceeds) a threshold pathloss value.

In some cases, wireless devices (e.g., IAB nodes 305, 310, or 315) may operate in one of more pathloss modes such as a high pathloss mode when the pathloss value satisfies (or exceeds) a threshold pathloss value or a normal (e.g., low) pathloss mode when the pathloss value is below the threshold pathloss value. For instance, one or more wireless devices may perform wireless communications in the wireless communications system 300 over a radio frequency spectrum band. In some aspects, this may include the wireless device(s) operating in a first pathloss mode (e.g., a low pathloss mode or normal mode) in the wireless communications system 300. The wireless device(s) may receive a signal that indicates that the pathloss value has satisfied (or exceeded) a threshold pathloss value. As one example, the wireless device(s) may monitor a channel of the radio frequency spectrum band (e.g., monitor signals being communicated over the channel) and determine that the pathloss value has satisfied (or exceeded) the threshold pathloss value. In another example, the wireless device(s) may receive a signal from another wireless device indicating that the pathloss value has satisfied (or exceeded) the threshold pathloss value. Accordingly, the wireless device(s) may switch from the first pathloss mode (e.g., a low pathloss mode) to a second pathloss mode (e.g., high pathloss mode) and continue to perform wireless communications. The second pathloss mode (e.g., the high pathloss mode) may include one or more parameters to support continued wireless communications in the high pathloss environment. Examples of the parameters that may be adjusted may include, but are not limited to, the length of the synchronization signal block (SSB) in the high pathloss mode being longer, the length of a reference signal in the high pathloss mode being longer, an MCS in the high pathloss mode being lower, and the like. Accordingly, the wireless devices may continue to perform wireless communications in the wireless communications system 300 in the high pathloss environment according to the second pathloss mode (e.g., the high pathloss mode).

As shown, IAB node 305 may communicate with IAB node 310 in a high pathloss mode (e.g., if the high pathloss mode is activated at IAB node 305 for these communications) and may communicate with IAB node 315 in a normal mode (e.g., if the high pathloss mode is deactivated at IAB node 305 for these other communications). An indication of which mode to use for communication may be transmitted from IAB node 305 to one or both of IAB nodes 310 and 315. For example, IAB node 305 may transmit a communication configuration 320-a to IAB node 310 to communicate in high pathloss mode. The communication configuration 320-a may instruct IAB node 310 to operate in the high pathloss mode for communications with IAB node 305. The communication configuration 320-a may also include a bandwidth part (BWP) information element 325-a that indicates BWP parameters for the BWP used for communication between IAB node 305 and IAB node 310. In some example, the communication configuration 320-a may include one or more additional bits 330-a, which may indicate that the BWP identified by BWP information element 325-a is configured for high pathloss communications. As shown, the one or more additional bits 330-a may be a part of the BWP information element 325-a.

For normal mode operations, IAB node 305 may transmit a communication configuration 320-b to IAB node 315. The communication configuration 320-b may include a BWP information element 325-b, and one or more additional bits 330-b, which may be a part of the BWP information element 325-b. The one or more additional bits 330-b may indicate that the BWP identified by BWP information element 325-b is configured for normal mode communications. Based on the communication configuration(s) 320, the DU and/or MT functionality of an IAB node 305, 310, or 315 may be configured with different downlink or uplink BWPs for high pathloss mode and normal mode that are activated based on the communication configuration(s) 320 sent to the respective IAB node 310 or 315. For example, IAB node 310 may perform communications using the high pathloss BWP identified by BWP information element 325-a upon reception (or after a duration following reception) of communication configuration 320-a.

In some cases, IAB node 305 may enter a high pathloss mode and may communicate with IAB node 310 after a given time interval. For example, the communication configuration 320-a may include timing information (e.g., an indication of a time interval that IAB node 310 is to wait before operating in high pathloss mode), and IAB node 305 may instruct IAB node 310 to activate a high pathloss BWP based on this timing information. In some cases, the BWP information element 325-a may include additional information (e.g., via the one or more additional bits 330-a) which indicates that the BWP has been configured for the high pathloss mode, which signals to the MT of IAB node 310 to fully enter the high pathloss mode after a specific time and no additional signaling may be used for entering or exiting high pathloss mode.

In some aspects, configuration parameters of the communication configuration 320 may be configured differently between pathloss modes (e.g., a first subset of configuration parameters may be variable between high pathloss mode and normal mode, while a second subset of configuration parameters may be configured to be the same between high pathloss mode and normal mode). For example, control resource set (CORESET) parameters, channel state information (CSI) resources, and sounding reference signal (SRS) resources may be different between high pathloss mode and normal mode. Further, if the one or more additional bits 330 correspond to a high pathloss mode (such as the one or more additional bits 330-a), a longer time duration for TTIs may be implemented for communications in the high pathloss mode as compared to the time duration associated with TTIs for normal mode. Additionally, or alternatively, rules specific to the high pathloss mode may be invoked (e.g., rules relating to procedures for interrupting data channels, such as a shared data channel, with a reference signal (RS), such as a tracking RS (TRS)).

In some cases, other parameters (e.g., a second subset of configuration parameters) may be configured to be the same between high pathloss and normal mode operations. For example, processing time related control parameters (e.g., latency parameters related to scheduling, parameters related to control operations) may remain the same for normal and high pathloss modes.

In some examples, the wireless communications system 300 may implement acknowledgment messaging for resource reservations. For example, a parent node, which may be an example of IAB node 305, IAB node 310, or IAB node 315, may transmit control information (e.g., including a resource reservation for one or more data transmissions) to one or more child nodes. The control information may indicate to the child nodes to transmit feedback (e.g., an acknowledgment message) for the transmitted control information and the resource reservation.

Figure 4:
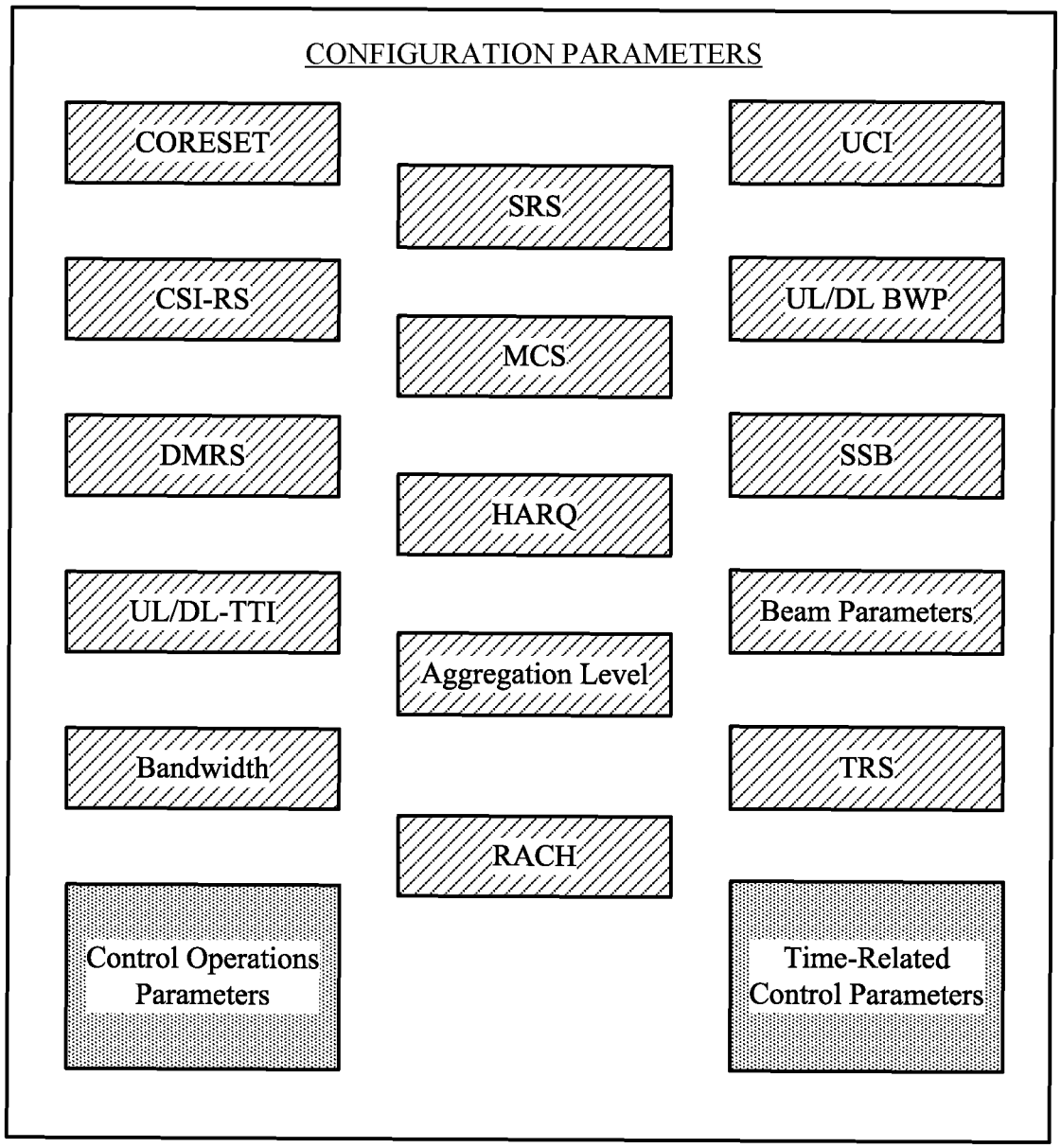
FIG. 4 illustrates examples configuration parameters that support acknowledgment messaging for resource reservations in accordance with one or more aspects of the present disclosure.

FIG. 4 illustrates example configuration parameters 400 that support acknowledgment messaging for resource reservations in accordance with one or more aspects of the present disclosure. Configuration parameters 400 may include a set of configuration parameters for configuring communications according to different pathloss modes.

In some examples, one or more configuration parameters 400 may be configured to support high pathloss mode communications (e.g., for devices operating in a high pathloss mode, such as a parent IAB node communicating with a child IAB node using a high pathloss communication link). Further, one or more configuration parameters 400 may be configured to support normal mode communications (e.g., for devices operating in a normal pathloss mode, such as a parent IAB node communicating with a child IAB node using a normal pathloss communication link).

In some cases, a subset of configuration parameters 400 may be configurable between pathloss modes. For example, one or more configuration parameters 400 may be variable or dynamic between pathloss modes, while other configuration parameters 400 may be static and remain the same between different pathloss modes. In one example, a subset of the configuration parameters 400 that may be different for high pathloss mode operation compared to normal mode operation. Such parameters may include CORESET parameters (e.g., CORESET #0 information or common CORESET information, CSI reference signal (CSI-RS) parameters (e.g., CSI-RS resource configuration, periodicity, measurement information), and SRS parameters (e.g., SRS configuration, SRS resources). Other configurable parameters may include uplink control information (UCI) parameters (e.g., UCI resources), MCS parameters (e.g., modulation order, coding scheme), and uplink or downlink BWP parameters (e.g., control or data channel configuration parameters, frequency location, numerology, timing information, etc.). Demodulation reference signal (DMRS) parameters (e.g., DMRS resources or mapping type), HARQ parameters (e.g., HARQ feedback information such as #HARQ N1, MCS, etc.), synchronization signal block (SSB) parameters (SSB position, periodicity, and/or power), uplink or downlink TTI information (e.g., uplink TTI duration and location, downlink TTI duration and location), aggregation level parameters, beam parameters (e.g., beam width or index), bandwidth parameters (e.g., cell RS ports, frequency information, etc.), TRS parameters (e.g., rules for interrupting a PUSCH), and random access channel (RACH) parameters (e.g., RACH timing and resources), among others may also be configurable between different pathloss modes.

For example, one or more MCS parameters of the configuration parameters 400 may be configurable between pathloss modes. An MCS parameter may be associated with or include an MCS table with a number of entries (e.g., 16 entries). An entry may correspond to a coding rate or modulation order (e.g., quadrature phase shift keying (QPSK), quadrature amplitude modulation (QAM) formats such as QAM16, QAM 64, and the like). In some examples, the MCS table may be configurable based on a pathloss mode. For example, the MCS table used for a normal pathloss operation mode may be different than the MCS table used for a high pathloss operation mode. In some examples, the MCS tables may be different (e.g., each MCS table may include different entries) based on channel conditions. For example, an MCS table may include different entries based on a pathloss dynamic range (e.g., whether the pathloss dynamic range is associated with a normal pathloss operation mode or a high pathloss operation mode), a signal-to-interference-plus-noise ratio (SINR), or any other channel condition metrics.

In some examples, a wireless device (e.g., a base station 105 or a parent IAB node) may send a control transmission (e.g., a PDCCH transmission) to a receiving wireless device (e.g., a UE 115 or a child IAB node). The control transmission may schedule a shared channel transmission (e.g., a PDSCH transmission or a PUSCH transmission). The control transmission may also include downlink control information (DCI), which may indicate, to the receiving wireless device, one or more configuration parameters 400. For instance, the DCI may indicate the MCS parameter (e.g., an entry of the MCS table) to the receiving wireless device. The receiving wireless device may determine a coding rate and modulation order based on the indication in the DCI (e.g., the coding rate and modulation order associated with the indicated entry of the MCS table). The receiving wireless device may use the determined coding and modulation order to transmit or receive a scheduled shared channel transmission.

Other configuration parameters 400 may be configured similarly between high pathloss and normal modes. For example, configuration parameters 400 such as time-related control parameters (e.g., processing time related parameters, latency parameters, switching time parameters, scheduling parameters, or any combination of these or similar control parameters) that may be configured the same for both high pathloss and normal modes. Further, other control operation parameters such as timing for beam change (e.g., timing between beam change command and the change of the beam) may be configured the same for both high pathloss and normal modes.

In some examples, configuration parameters 400 may support acknowledgment messaging for resource reservations. For example, the parent node may transmit control information (e.g., including a resource reservation for one or more data transmissions) to one or more child nodes. In some examples, some of the configuration parameters 400 may be configured between high pathloss and normal modes. The control information may indicate to the child nodes to transmit feedback (e.g., an acknowledgment message) for the transmitted control information and the resource reservation based on the configuration parameters 400.

Figure 5:
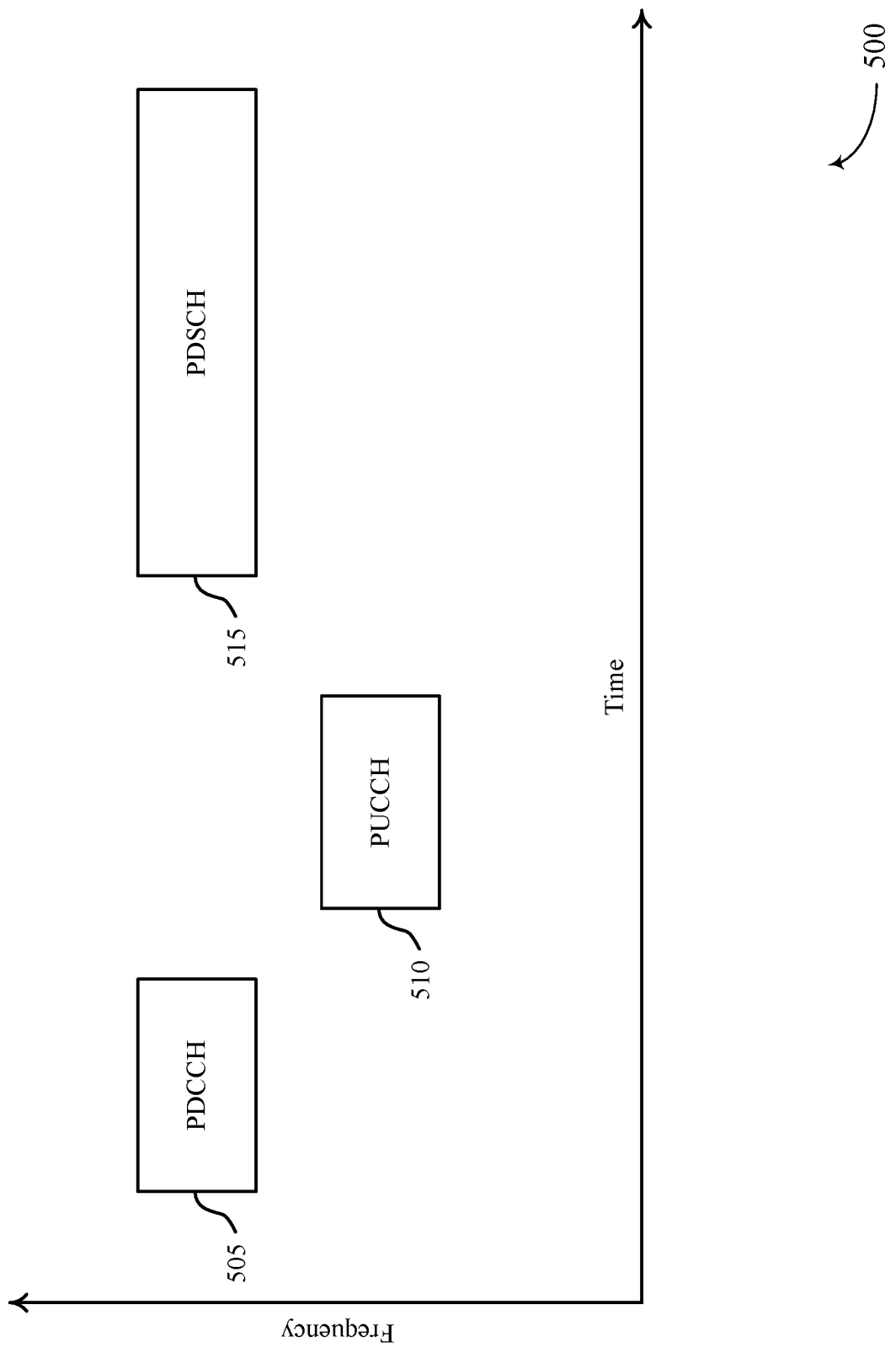
FIGS. 5 and 6 illustrate examples of resource mappings that support acknowledgment messaging for resource reservations in accordance with one or more aspects of the present disclosure.

FIG. 5 illustrates an example of a resource mapping 500 that supports acknowledgment messaging for resource reservations in accordance with one or more aspects of the present disclosure. In some examples, the resource mapping 500 may implement aspects of wireless communications systems 100, 200, or 300. The resource mapping 500 may illustrate communications between wireless devices, which may be examples of devices described herein (e.g., donor nodes 210, relay nodes 215, base stations 105, UEs 115, etc.). For example, the resource mapping 500 may illustrate communications shown with reference to an x-axis (e.g., representing time associated with one or more resources) and a y-axis (e.g., representing frequency associated with one or more resources). In some examples, the communications may be between a parent node (e.g., an antecedent relay node 215 or donor node 210) and a child node (e.g., a descendant relay node 215 or UE 115). In some examples, the resource mapping 500 may be an example illustration of communications in an IAB network (e.g., as described with respect to FIG. 2). In other examples, the resource mapping 500 may be an example of communications in other wireless communications systems.

The resource mapping 500 may include a control message 505. In some examples, the control message 505 may be a control transmission (e.g., a control message transmitted via a PDCCH) between devices (e.g., communications via a wireline backhaul link 220, a wireless backhaul link 225, a backup wireless backhaul link 230, or an access link 235). For example, a wireless device such as a parent node may transmit the control message 505 to one or more other wireless devices, such as child nodes. In some examples, the control message 505 may indicate resources to be utilized (e.g., via a resource reservation) for the transmission of a data message 515.

In some examples, the data message 515 may be a data transmission (e.g., data transmitted via a PDSCH). In some examples, the data message 515 may be an example of a communication between devices (e.g., via a wireline backhaul link 220, a wireless backhaul link 225, a backup wireless backhaul link 230, or an access link 235). For example, a wireless device such as a parent node may transmit the data message 515 to one or more other wireless devices, such as child nodes.

As discussed herein, in some wireless communications systems (e.g., systems operating in a high pathloss mode), the transmission duration of signals such as control channel transmissions or data channel transmissions may be significantly increased. However, in some cases, such as when a control message 505 is lost, this may result in increased overhead. For example, a parent node may transmit a control message 505 to one or more child nodes. The control message 505 may indicate a data message 515 (e.g., the control message may indicate resources to monitor for the data message 515, a time gap between the control message 505 and the PDSCH transmissions, etc.). If a child node fails to receive or decode a control message 505 (e.g., due to high path loss, interference, blocking, etc.), the child node may be unable to receive or decode a corresponding data message 515, which may result in inefficient signaling and performance loss. For example, the parent node may be unable to determine that the control message 505 was lost for a relatively long time. The parent node may transmit the data message 515 (e.g., for a relatively long duration, such as 10 or 20 ms) despite the child node being unable to receive this transmission. That is, the parent node may determine that the control message 505 was lost after transmitting the data message 515 and monitoring for feedback (e.g., HARQ feedback for the data message 515), which may utilize significant overhead and result in significant latency (e.g., in a wireless communications system with relatively longer transmission times, such as when a device operates in a high pathloss mode operation).

In some examples, the wireless communications systems may determine to implement feedback for resource reservations (e.g., for high pathloss communications) as described herein. In some cases, the parent node may perform a pathloss measurement and activate or deactivate a high pathloss mode based on the measurement. In other cases, the parent node may receive an indication that the child node has activated a high pathloss mode for communication with the parent node. In any of these cases, the parent node may support the active high pathloss mode by implementing acknowledgment messaging for resource reservations.

The parent node may transmit a control message 505 indicating a resource reservation for the data message 515. The parent node may also indicate to one or more child nodes to transmit feedback for the control message 505. For example, the parent node may indicate to transmit a feedback message 510 (e.g., including HARQ feedback for the control message 505). A child node may transmit the feedback message 510 including feedback (e.g., a positive acknowledgment (ACK) or a negative acknowledgment (NACK)) for the control transmission (e.g., the resource reservation for the data message 515). Such feedback to the control message 505 may enable the parent node to more quickly detect a failure of the child node to receive or decode the control message 505, which may result in more efficient signaling (e.g., the parent node may refrain from transmitting the corresponding data message 515 to reduce processing overhead).

In some examples, the feedback message 510 may be a control transmission (e.g., a control transmission transmitted via a PUCCH) between devices (e.g., via a wireline backhaul link 220, a wireless backhaul link 225, a backup wireless backhaul link 230, or an access link 235). For example, a wireless device such as a child node may transmit the feedback message 510 to one or more other wireless devices, such as a parent node.

The feedback message 510 may include feedback (e.g., HARQ feedback such as an ACK or a NACK) to the control message 505. In some examples, the feedback may be transmitted or signaled using HARQ mechanisms similar to the feedback for the data message 515. In some cases, the feedback message 510 may be used in addition or alternative to a feedback message (e.g., a HARQ process) for the data message 515. The child node may transmit the feedback message 510 to the parent node to indicate that the child node was successful or unsuccessful in receiving and decoding the control message 505. In some examples, the child node may determine to transmit the feedback message 510 based on whether the wireless communications system is operating in a high pathloss mode. In other examples, the child node may determine to transmit the feedback message 510 based on an indicator in the control message 505. In some cases, the child node may determine the resources for transmitting the feedback message 510 based on the control message 505. For example, the child node may determine which resources to utilize for the feedback message 510 based on an implicit mapping between one or more resources of the received control message 505 and a corresponding feedback message 510 opportunity. The child node may be configured with the implicit mapping (e.g., via RRC signaling). For example, the implicit mapping may enable the child node to determine the resources for the feedback message 510 based on determining a resource in which the control message 505 is received, the reserved resources for the data message 515, or a combination thereof. Additionally or alternatively, the child node may determine which resources to utilize for the feedback message 510 based on an indication of the allocated resources for the feedback message 510 in the control message 505. For example, the control message 505 may include an explicit indication (e.g., using a value in a data field) of resources to utilize for the feedback message 510 transmission.

In some examples, the parent node may wait for the feedback message 510 before transmitting data message 515. That is, the parent node may monitor resources in a control channel (e.g., a PUCCH) to receive the feedback message 510. The parent node may determine the resources to monitor for the feedback message 510 (e.g., the ACK signal to the resource assignment in the control message 505). For example, the parent node may determine to monitor for the feedback message 510 based on whether the parent node, the child node, or both are operating in a high pathloss mode. In some cases, the parent node may transmit an indication (e.g., in the control message 505) of the resource allocation for the feedback message 510 (e.g., a PUCCH transmission). In some examples, the parent node may receive the feedback message 510 indicating that the control message 505 was received successfully. In such examples, the parent node may transmit the data message 515 in the resources reserved by the control message 505.

In other examples, the parent node may determine that the child node failed to receive or decode the control message 505. For example, the parent node may not receive a feedback message 510 (e.g., including an ACK) or may receive the feedback message 510 indicating that the control message 505 was not received or decoded successfully (e.g., such as a NACK). In either case, the parent node may determine to retransmit the control message 505 or transmit an additional control message 505 (e.g., instead of transmitting the corresponding data message 515 and waiting for feedback to the data message 515). The parent node may use the reserved resources (or an initial portion of the reserved resources) to retransmit the control message 505.

The reserved resources indicated by the control message 505 may be separated in time from the resources used by the control message 505 based on the activated or deactivated pathloss mode. For example, the separation in time may be shorter if the parent node determines to deactivate the high pathloss mode (e.g., to enable more efficient communications if low pathloss is measured), or the separation in time may be longer if the parent node determines to activate the high pathloss mode (e.g., to allow for transmission of the feedback message 510 and accordingly enable more reliable communications if high pathloss is measured).

In some examples, retransmitting the lost control message 505 or transmitting an additional control message 505 based on the feedback message 510 (e.g., based on the feedback to the resource allocation in the control message 505) may enable more efficient and robust communications. For example, a parent node may be able to detect that the control message 505 was lost after a monitoring window (e.g., the time between the last symbol of the control message 505 and the indicated resources for the data message 515). This monitoring window may be a smaller time interval than the time for receiving feedback to the data message 515 (e.g., after transmitting the relatively long data message 515), which may enable quicker detection and retransmission of a lost control message 505. For example, based on the acknowledgment signaling for a resource assignment, the parent node may retransmit a missed control message 505 in time resources (e.g., initial time resources) of the reserved resources for the data message 515, rather than after determining the data message 515 was missed based on a HARQ procedure for the data (e.g., in time resources after the reserved resources for the data message 515 and resources for HARQ signaling).

Figure 6:
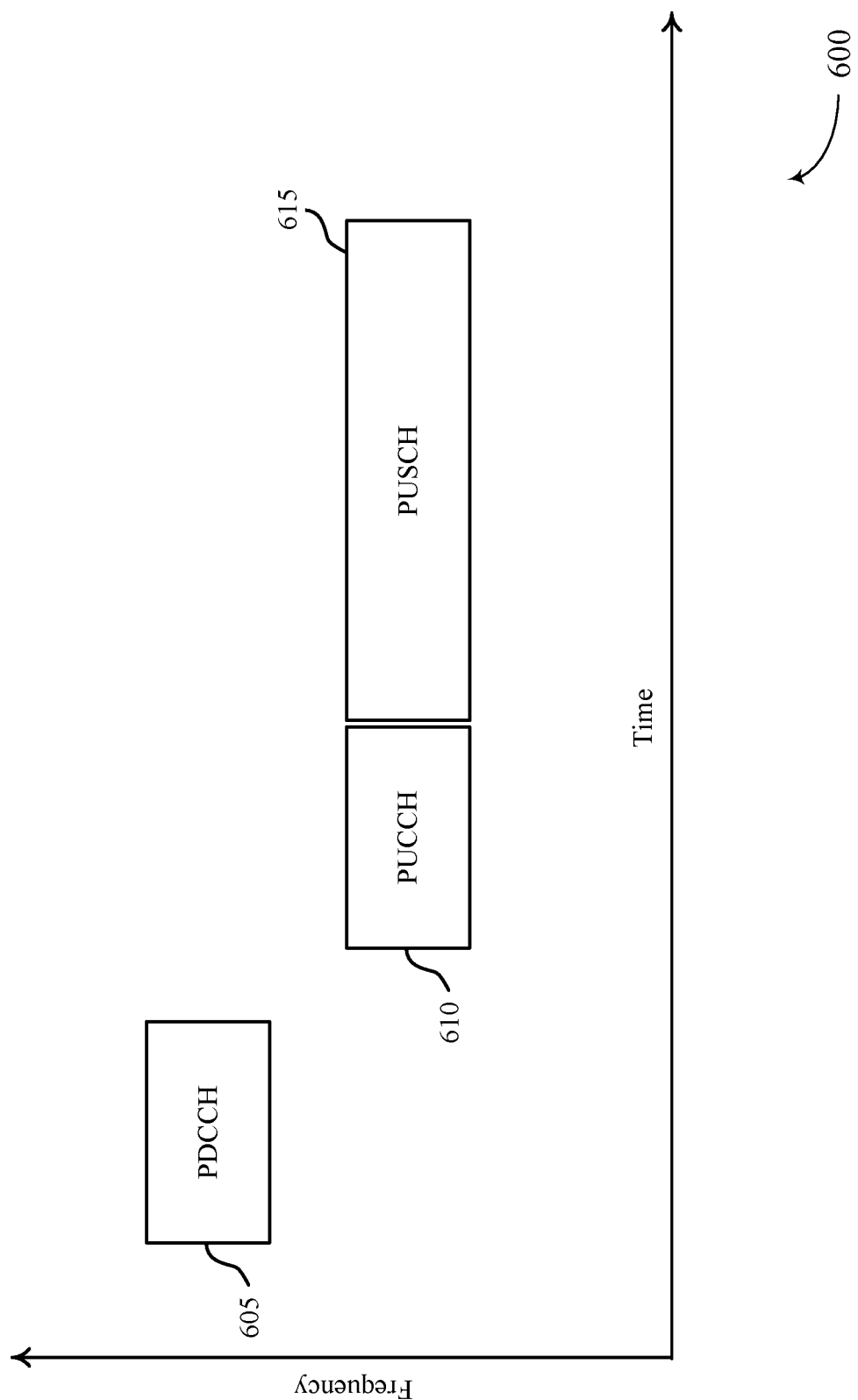

FIG. 6 illustrates an example of a resource mapping 600 that supports acknowledgment messaging for resource reservations in accordance with one or more aspects of the present disclosure. In some examples, the resource mapping 600 may implement aspects of wireless communication systems 100, 200, or 300. The resource mapping 600 may illustrate communications between wireless devices, which may be examples of devices described herein (e.g., donor nodes 210, relay nodes 215, base stations 105, UEs 115, etc.). For example, the resource mapping 600 may illustrate communications shown with reference to an x-axis (e.g., representing time associated with one or more resources) and a y-axis (e.g., representing frequency associated with one or more resources). In some examples, the communications may be between a parent node (e.g., an antecedent relay node 215 or donor node 210) and a child node (e.g., a descendant relay node 215 or UE 115). In some examples, the resource mapping 600 may be an example of communications in an IAB network (e.g., as described with respect to FIG. 2). In other examples, the resource mapping 600 may be an example of communications in other wireless communications systems.

In some examples, resource mapping 600 may include a control message 605. The control message 605 may be sent in a control transmission (e.g., a control message transmitted via a PDCCH) between devices (e.g., communications via a wireline backhaul link 220, a wireless backhaul link 225, a backup wireless backhaul link 230, or an access link 235). For example, a wireless device such as a parent node may transmit the control message 605 to one or more other wireless devices, such as child nodes. In some examples, the control message 605 may indicate resources to be utilized for the transmission of a scheduled data message 615. For example, the parent node may transmit a control message 605 indicating resources for a child node to utilize for transmitting the data message 615.

In some cases, the data message 615 may be a data transmission (e.g., data transmitted via a PUSCH) between devices (e.g., communications via a wireline backhaul link 220, a wireless backhaul link 225, a backup wireless backhaul link 230, or an access link 235). For example, a wireless device such as a child node may transmit the data message 615 to one or more other wireless devices, such as a parent node.

As discussed herein, in some wireless communications systems (e.g., systems with devices operating in a high pathloss mode), the transmission duration of signals such as control channel transmissions or data channel transmissions may be significantly increased. However, in some cases, such as when a control message 605 is lost, this may result in increased overhead and signaling latency. For example, a parent node may transmit a control message 605 to one or more child nodes. The control message 605 may indicate a data message 615 (e.g., the control message may indicate resources allocated for transmitting the data message 615, a time gap between the control message 605 and the data message 615, etc.). If a child node fails to receive or decode the control message 605 (e.g., due to high path loss, interference, blocking, etc.), the child node may be unaware of the transmission opportunity for the data message 615, which may result in inefficient signaling and performance loss. For example, the parent node may be unable to determine that the control message 605 was lost for a relatively long time. The parent node may monitor for the data message 615 (e.g., for a relatively long duration, such as 10 or 20 ms) despite the child node being unable to transmit the data due to the lost control message 605. In some examples, the parent node may determine that the control message 605 was lost after monitoring for the data message 615, which may result in significant overhead and latency (e.g., in a wireless communications system with relatively longer transmission times, such as a system with devices operating in a high pathloss mode).

In some examples, the wireless communications systems may support devices (e.g., base stations 105 and UEs 115) operating in a high pathloss mode. In such examples, a parent node may determine to implement feedback for resource reservations as described herein. For example, the parent node may perform a pathloss measurement and activate or deactivate a high pathloss mode based on the measurement. Additionally or alternatively, the parent node may receive a message indicating whether the high pathloss mode is activated at the child node. The parent node may transmit a control message 605 indicating a resource reservation for a data message 615. The parent node may also indicate to one or more child nodes to transmit feedback for the control message 605 (e.g., when the high pathloss mode is activated). For example, the parent node may command the child node to transmit a feedback message 610 (e.g., including HARQ feedback for the control message 605). A child node may transmit the feedback message 610 including feedback (e.g., an ACK or NACK) indicating whether reception of the control message 605 (e.g., including the resource reservation for the data message 615) was successful or not. Such feedback to the control message 605 may enable the parent node to more quickly detect a failure to receive or decode the control message 605, which may result in more efficient signaling (e.g., the parent node may refrain from monitoring for the data message 615 to reduce processing overhead and signaling latency if the parent node does not receive an ACK within a monitoring window).

In some examples, the feedback message 610 may be a control transmission (e.g., a control transmission transmitted via a PUCCH). In some examples, the feedback message 610 may be an example of a communication between devices (e.g., via a wireline backhaul link 220, a wireless backhaul link 225, a backup wireless backhaul link 230, or an access link 235). A wireless device such as a child node may transmit the feedback message 610 to one or more other wireless devices, such as a parent node.

The feedback message 610 may include feedback (e.g., HARQ feedback such as an ACK or a NACK) for the control message 605 and the corresponding resource reservation. For example, the child node may transmit the feedback message 610 on an uplink control channel to the parent node, where the feedback may include an ACK signal for a resource assignment in the control message 605. In some examples, the child node may determine to transmit the feedback message 610 based on whether the child node, the parent node, or both are operating in a high pathloss mode. In some examples, the child node may determine the resources for transmitting the feedback message 610 based on the control message 605. For example, the child node may determine which resources to utilize for the feedback message 610 based on an implicit mapping between one or more resources of the received control message 605 and a corresponding feedback message 610 opportunity, based on an implicit mapping between a scheduled data message 615 and corresponding resources for the feedback message 610, based on an indication of the allocated resources for the feedback message 610 in the control message (e.g., in a downlink control information (DCI) field), or a combination thereof. In some examples, the feedback message 610 may be transmitted in a time division multiplexing (TDM) manner with the scheduled data message 615.

The parent node may monitor for the feedback message 610. For example, the parent node may determine to monitor for the feedback message 610 based on whether the parent node, the child node, or both are operating in a high path loss mode. For example, the parent node may perform a pathloss measurement and activate a high pathloss mode based on the measurement. The parent node may also determine to implement feedback techniques as described herein (e.g., scheduling the feedback message 610 to receive feedback for a control message 605). In some examples, the parent node may receive the feedback message 610 indicating that the control message 605 was received successfully at a child node (e.g., the feedback message 610 may include an ACK). In such examples, the parent node may monitor for the corresponding data message 615 from the child node in the designated resources.

In other examples, the parent node may determine that the child node failed to receive or decode the control message 605. For example, the parent node may not receive a feedback message 610 (e.g., including an ACK) or may receive the feedback message 610 indicating that the control message 605 was not received or decoded successfully (e.g., such as a NACK). In some other examples, the parent node may determine feedback for the control message 605 without scheduling the feedback message 610. For example, the parent node may perform a measurement (e.g., an energy measurement) in the designated resources for the data message 615. The parent node may determine whether a signal (e.g., a data message 615) is present in the channel (e.g., a PUSCH) based on the measurement. In some examples, the parent node may determine that the child node failed to receive or decode the control message 605 if the parent node determines that there is no signal present in the designated resources (e.g., the parent node does not detect a data message 615 from the child node in the reserved resources). In any of these cases, the parent node may determine to retransmit the control message 605 or transmit an additional control message 605 to the child node based on the determination that the child node failed to receive or decode the control message 605 and is accordingly not transmitting the data message 615.

The reserved resources indicated by the control message 605 may be separated in time from the resources used by the control message 605 based on the activated or deactivated pathloss mode. For example, the separation in time may be shorter if the parent node determines to deactivate the high pathloss mode, or the separation time may be longer if the parent node determines to activate the high pathloss mode (e.g., such that the PUCCH resources can be TDMed prior to the resource reservation for the data message 615).

In some cases, the resources for control messages 505 or 605, feedback messages 510 or 610, data messages 515 or 615, or some combination of these messages may be separated in time by time gaps based on processing timelines for the wireless devices. For example, the resources for a feedback message may be separated in time from the resources for a control message based on a processing timeline for the child node to receive the control message, decode the control message, determine the assignment, and prepare a corresponding feedback message for transmission. If the resource reservation is for an uplink data transmission (e.g., such as a data message 615), these resources may follow the feedback resources directly in time (e.g., the parent node may automatically begin monitoring for the data message 615 while attempting to receive and process the feedback message 610 and may terminate the monitoring early if an ACK is not received in the feedback resources). Alternatively, if the resource reservation is for a downlink data transmission (e.g., such as data message 515), the resources for the data message 515 may be separated in time from the resources for the feedback message 510 based on a processing timeline for the parent node to receive the feedback message 510, decode the feedback message 510, determine whether to transmit the data message 515 or retransmit a control message 505, and prepare the corresponding message for transmission. In some cases, the parent node may prepare the data message 515 for transmission prior or subsequent to receiving the feedback to speed up the processing timeline, but may refrain from transmitting the data message 515 if a NACK or no feedback message 510 is received.

Figure 7A:
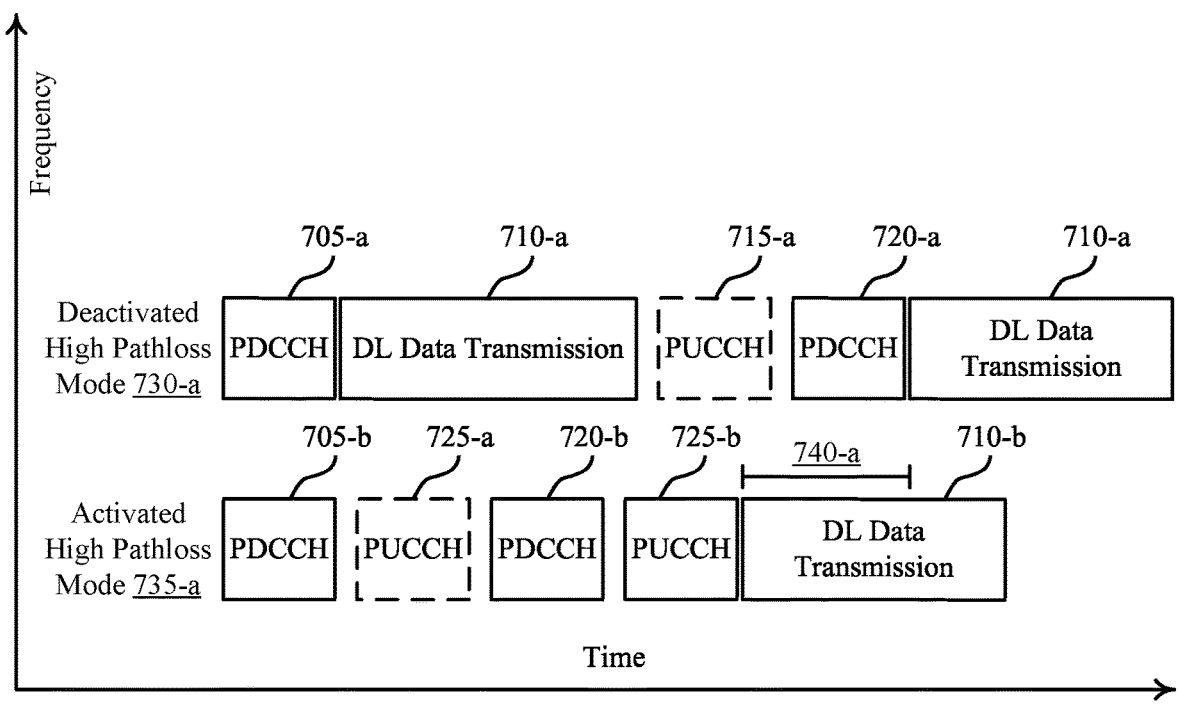
FIGS. 7A and 7B illustrate examples of timelines that support acknowledgment messaging for resource reservations in accordance with one or more aspects of the present disclosure.

FIG. 7A illustrates an example of a timeline 700A that supports acknowledgment messaging for resource reservations in accordance with one or more aspects of the present disclosure. In some examples, the timeline 700A may implement aspects of wireless communications systems 100, 200, or 300. The timeline 700A may illustrate communications between wireless devices, which may be examples of devices described herein (e.g., donor nodes 210, relay nodes 215, base stations 105, UEs 115, etc.). For example, the timeline 700A may illustrate communications shown with reference to an x-axis (e.g., representing time associated with one or more resources) and a y-axis (e.g., representing frequency associated with one or more resources). In some examples, the communications may be between a parent node (e.g., an antecedent relay node 215 or donor node 210) and a child node (e.g., a descendant relay node 215 or UE 115). In some examples, the timeline 700A may be an example of communications in an IAB network (e.g., as described with respect to FIG. 2). In other examples, the timeline 700A may be an example of communications in other wireless communications systems.

In some examples, the timeline 700A may include control messages 705. The control messages 705 may be examples of control messages 505 as described with respect to FIG. 5 (e.g., a control transmission sent via a PDCCH). In some examples, a wireless device such as a parent node may transmit a control message 705 to another wireless device, such as a child node. In some examples, the control message 705 may indicate resources to be utilized (e.g., via a resource reservation) for the transmission of a downlink data transmission 710. The downlink data transmission 710 may be an example of a data message 515 as described with respect to FIG. 5 (e.g., data transmitted via a PDSCH). In some examples, the downlink data transmission 710 may be an example of a communication between devices (e.g., via a wireline backhaul link 220, a wireless backhaul link 225, a backup wireless backhaul link 230, or an access link 235). For example, a wireless device such as a parent node may transmit the downlink data transmission 710 to one or more other wireless devices, such as child nodes.

In some examples, the timeline 700A may also include feedback messages. For example, a HARQ message 715 may provide feedback information for a data transmission, such as a downlink data transmission 710, while a feedback message 725 may provide feedback (e.g., acknowledgment information) for a resource reservation (e.g., in a control message 705). The feedback messages 725 may be examples of feedback messages 510 as described with respect to FIG. 5 (e.g., an acknowledgment message transmitted via a PUCCH). In some examples, the feedback messages may be examples of communications between devices (e.g., via a wireline backhaul link 220, a wireless backhaul link 225, a backup wireless backhaul link 230, or an access link 235). For example, a wireless device such as a child node may transmit a feedback message to another wireless device, such as a parent node.

In some cases, the parent node may perform a pathloss measurement and activate or deactivate a high pathloss mode based on the measurement. In other cases, the parent node may receive an indication that the child node has activated or deactivated a high pathloss mode for communication with the parent node. In either of these cases, the parent node may operate according to a deactivated high pathloss mode 730-a or an activated high pathloss mode 735-a in the downlink.

In some examples, the parent node may implement deactivated high pathloss mode 730-a. The parent node may transmit a control message 705-a. The control message 705-a may indicate, to a child node, a resource reservation for a downlink data transmission 710-a. In some cases, this resource reservation may be contiguous in time to the resources used for the control message 705-a transmission. The parent node may transmit the downlink data transmission 710-a using the indicated resources. In some examples, the child node may successfully receive and decode control message 705-a and downlink data transmission 710-a. In such examples, the child node may transmit a HARQ message 715-a (e.g., an ACK) indicating the successful reception of the downlink data transmission 710-a. In other examples, the child node may not successfully receive or decode the control message 705-a (e.g., the resource reservation), which may also result in the child node failing to receive the downlink data transmission 710-a (e.g., the child node may not identify the resources to monitor for the downlink data transmission 710-a). In such examples, the child node may not transmit a HARQ message 715-a in a resource reserved for the HARQ transmission (e.g., due to failing to receive the control message 705-a). The parent node may monitor for the HARQ message 715-a after transmitting the downlink data transmission 710-a and may identify the absence of the HARQ message 715-a in the monitoring window.

Based on monitoring for the HARQ message 715-a, the parent node may determine that the child node failed to receive or decode the downlink data transmission 710-a. For example, the parent node may not detect a HARQ message 715-a or the parent node may receive a NACK. The parent node may determine to transmit an additional control message 720-a based on the child node failing to receive the downlink data transmission 710-a. In some cases, the additional control message 720-a may indicate additional resources for a retransmission of the downlink data transmission 710-a. In such an example, despite a child node failing to receive the control message 705-a, the parent node may transmit the downlink data transmission 710-a twice.

In some examples, the parent node may implement the activated high pathloss mode 735-a. Similar to the deactivated high pathloss mode 730-a, the parent node may transmit a control message 705-b. The control message 705-b may indicate, to a child node, a resource reservation for a downlink data transmission 710-b. However, the child node may determine to transmit a feedback message 725-a for the resource reservation (e.g., based on the parent node, the child node, or both operating in the activated high pathloss mode 735-a or based on an indicator in the control message 705-b). The feedback message 725-a may include feedback (e.g., an acknowledgment message) for the control message 705-b. In some examples, the feedback may be transmitted or signaled using HARQ mechanisms similar to the HARQ message 715-a. The child node may transmit the feedback message 725-a to the parent node to indicate whether the child node was successful or unsuccessful in receiving and decoding the control message 705-b.

The parent node may monitor for the feedback message 725-a prior to transmitting the downlink data transmission 710-b. That is, the parent node may monitor resources in a control channel (e.g., a PUCCH) to receive the feedback message 725-a in a monitoring window prior to the reserved resources for the downlink transmission 710-b. The parent node may determine the resources to monitor for the feedback message 725-a (e.g., the ACK signal to the resource assignment in the control message 705-b) based on whether the parent node, the child node, or both are operating in the activated high pathloss mode 735-a. In some cases, the parent node may transmit an indication (e.g., in the control message 705-b) of the resource allocation for the feedback message 725-a.

In some examples, the parent node may determine that the child node failed to receive or decode the control message 705-b. For example, the parent node may not receive a feedback message 725-a (e.g., including an ACK) or may receive the feedback message 725-a indicating that the control message 705-b was not received or decoded successfully (e.g., a NACK). In either case, the parent node may determine to retransmit the control message 705-b or transmit an additional control message 720-b (e.g., instead of transmitting the corresponding downlink data transmission 710-b). This additional control message 720-b may be transmitted in resources initially reserved for the downlink data transmission 710-b by the control message 705-b.

The parent node may transmit the additional control message 720-b and may monitor for a feedback message 725-b. If the parent node receives the feedback message 725-b indicating that the child node received the additional control message 720-b successfully, the parent node may transmit the downlink data transmission 710-b in the resources reserved by the additional control message 720-b.

In some examples, the reserved resources indicated by a control message 705 or an addition control message 720 may be separated in time from the resources used by the control message 705 or the additional control message 720 based on the pathloss mode. For example, the separation in time may be shorter if the parent node determines to operate in the deactivated high pathloss mode 730-a (e.g., to enable more efficient communications if low pathloss is measured), or the separation in time may be longer if the parent node determines to operate in the activated high pathloss mode 735-a (e.g., to allow for transmission of a feedback message 725 in response to the control message 705).

In some examples, retransmitting the lost control message 705-b or transmitting an additional control message 720-b based on the feedback message 725-a for the resource allocation may enable more efficient and robust communications. For example, a parent node may be able to detect that the control message 705-b was lost after a monitoring window (e.g., the time between the last symbol of the control message 705-b transmission and the indicated resource reservation). This monitoring window may be a smaller time interval than the time for receiving a HARQ message 715-a for data in the deactivated high pathloss mode 730-a. In some examples, the monitoring window may be configured at one or more devices. For example, parameters of the monitoring window, such as a starting point, an ending point, a duration, or any combination thereof, may be pre-configured at the parent node and/or the child node (i.e., the devices may determine the parameters of the monitoring window, such as the starting point and/or ending point, prior to the communications illustrated in timeline 700A, or such parameters may be signaled between devices). Implementing a feedback message 725 for a resource reservation may enable fast detection of an unsuccessful transmission (e.g., especially for relatively long downlink data transmissions 710). For example, if a child node fails to successfully receive a control message 705 in an activated high pathloss mode 735-a supporting acknowledgment messaging for resource reservations, as opposed to in a deactivated high pathloss mode 730-a, the parent node may be able to successfully retransmit an additional control message 720 and the corresponding downlink data transmission 710 with a lower latency shown by the time interval 740-a.

Figure 7B:
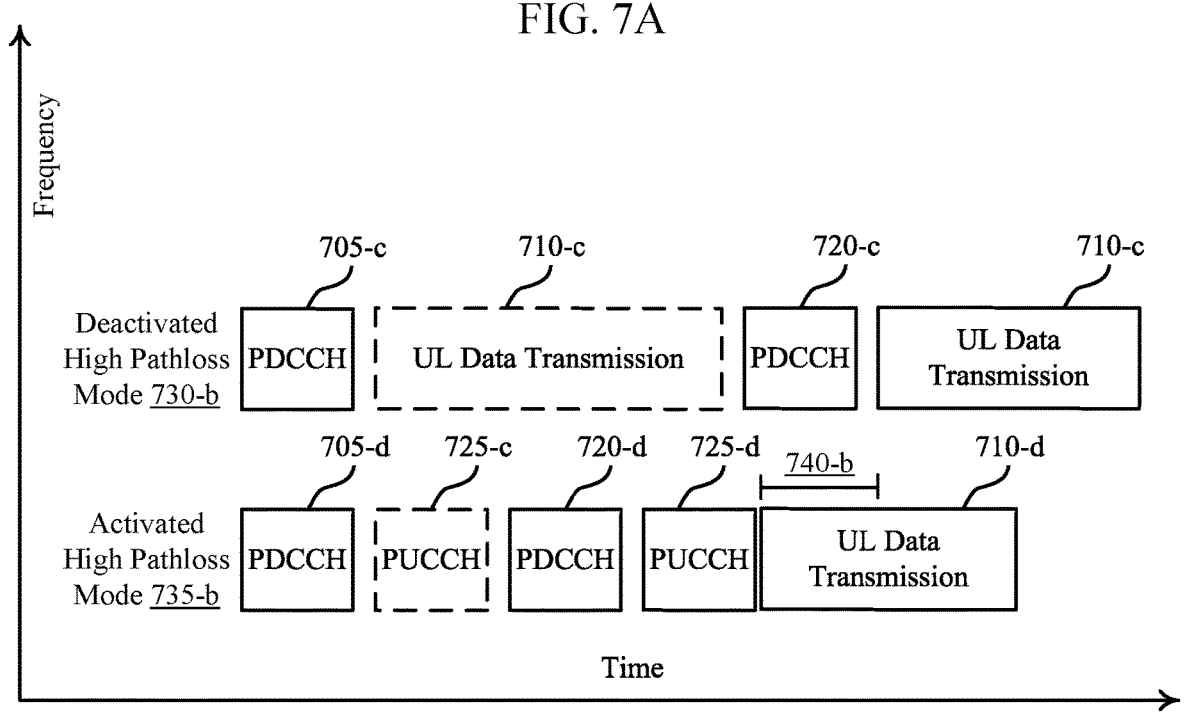

FIG. 7B illustrates an example of a timeline 700B that supports acknowledgment messaging for resource reservations in accordance with one or more aspects of the present disclosure. In some examples, the timeline 700B may implement aspects of wireless communications systems 100, 200, or 300. The timeline 700B may illustrate communications between wireless devices, which may be examples of devices described herein (e.g., donor nodes 210, relay nodes 215, base stations 105, UEs 115, etc.). For example, the timeline 700B may illustrate communications shown with reference to an x-axis (e.g., representing time associated with one or more resources) and a y-axis (e.g., representing frequency associated with one or more resources). In some examples, the communications may be between a parent node (e.g., an antecedent relay node 215 or donor node 210) and a child node (e.g., a descendant relay node 215 or UE 115). In some examples, the timeline 700B may be an example of communications in an IAB network (e.g., as described with respect to FIG. 2). In other examples, the timeline 700B may be an example of communications in other wireless communications systems.

In some cases, the timeline 700B may include control messages 705, feedback messages 725, and additional control messages 720 as described herein with respect to FIG. 7A. The timeline 700B may also include uplink data transmissions 710, which may be examples of data messages 615 as described with respect to FIG. 6 (e.g., data transmitted via a PUSCH). The uplink data transmissions 710 may be examples of communications between devices (e.g., communications via a wireline backhaul link 220, a wireless backhaul link 225, a backup wireless backhaul link 230, or an access link 235). For example, a wireless device such as a child node may transmit an uplink data transmission 710 to one or more other wireless devices, such as a parent node.

In some cases, the parent node may perform a pathloss measurement and activate or deactivate a high pathloss mode based on the measurement. In other cases, the parent node may receive an indication that the child node has activated or deactivated a high pathloss mode for communication with the parent node. In any of these cases, the parent node may operate according to a deactivated high pathloss mode 730-b or an activated high pathloss mode 735-b.

In some examples, the parent node may implement deactivated high pathloss mode 730-b. The parent node may transmit a control message 705-c. The control message 705-c may indicate, to a child node, a resource reservation for an uplink data transmission 710-c. The child node may transmit the uplink data transmission 710-c using the indicated resources. In some examples, the child node may successfully receive and decode the control message 705-c and transmit the corresponding uplink data transmission 710-c. In other examples, the child node may not successfully receive or decode the control message 705-c (e.g., the resource reservation), which may result in the child node failing to transmit the uplink data transmission 710-c in the reserved resources. In any of these examples, the parent node may monitor for the uplink data transmission 710-c in the reserved resources. In some cases, the parent node may determine that the child node failed to receive or decode the control message 705-c. For example, the parent node may not detect or receive an uplink data transmission 710-c in the resources indicated by the control message 705-c. The parent node may determine to transmit an additional control message 720-c. The control message 720-c may indicate additional resources for a retransmission of the uplink data transmission 710-c. However, the parent node may identify this failure of the child node to receive the control message 705-c based on attempting to process any signals received while monitoring during the reserved resources. As such, the parent node may determine that the child node missed the control message 705-c following the resource reservation for the uplink transmission 710-c.

In some examples, the parent node may implement the activated high pathloss mode 735-b. The parent node may transmit a control message 705-d. The control message 705-d may indicate, to a child node, a resource reservation for an uplink data transmission 710-d. Additionally, the child node may determine to transmit a feedback message 725-c for the resource reservation (e.g., based on the parent node, the child node, or both operating in the activated high pathloss mode 735-a or based on an indicator in the control message 705-d). The feedback message 725-c may include feedback for the control message 705-d and may be transmitted or signaled using HARQ mechanisms similar to the feedback in a HARQ message 715. The child node may transmit the feedback message 725-c to the parent node to indicate that the child node successfully received and decoded the control message 705-d.

In some examples, the parent node may monitor for the feedback message 725-c prior to the reserved resources for the uplink data transmission 710-d. That is, the parent node may monitor resources in a control channel (e.g., a PUCCH) to receive the feedback message 725-c. The parent node may determine the resources to monitor for the feedback message 725-c (e.g., an ACK signal to the resource assignment in the control message 705-d). In some cases, the parent node may transmit an indication (e.g., in the control message 705-d) of the resource allocation for the feedback message 725-c.

In some examples, the parent node may determine that the child node failed to receive or decode the control message 705-d. For example, the parent node may not receive a feedback message 725-c (e.g., including an ACK) or may receive the feedback message 725-c indicating that the control message 705-d was not received or decoded successfully at the child node (e.g., such as a NACK). In either case, the parent node may determine to retransmit the control message 705-*d* or transmit an additional control message 720-*d* (e.g., instead of monitoring for the corresponding uplink data transmission 710-*d*).

The parent node may transmit the additional control message 720-*d* and may monitor additional resources (e.g., reserved resources indicated by additional control message 720-*d*) for a corresponding feedback message 725-*d* and the uplink data transmission 710-*d*. The parent node may receive the feedback message 725-*d* (e.g., an acknowledgment message), may determine that the additional control message 720-*b* was received successfully by the child node, and may monitor for the uplink data transmission 710-*d* from the child node in the reserved resources.

In some examples, the reserved resources indicated by a control message 705-*d* or an addition control message 720-*d* may be separated in time from the resources used by the control message 705-*d* or the additional control message 720-*d* based on the pathloss mode. For example, the separation in time may be shorter if the parent node determines to operate in the deactivated high pathloss mode 730-*b*, or the separation in time may be longer if the parent node determines to operate in the activated high pathloss mode 735-*b* (e.g., such that the PUCCH resources for a resource reservation feedback message 725 may be TDMed prior to the resource reservation for the uplink data message 710-*d*).

In some examples, retransmitting the lost control message 705-*d* or transmitting an additional control message 720-*d* based on the feedback message 725-*c* (e.g., based on the feedback to the resource allocation in the control message 705-*d*) may enable more efficient and robust communications. For example, a parent node may be able to detect that the control message 705-*d* was lost prior to monitoring for an entire uplink data transmission 710. The acknowledgment messaging for resource reservations may enable quicker detection of lost control messages 705, which may enable quicker retransmission of control messages 705 and, correspondingly, lower latency associated with successful transmissions of uplink data transmissions 710. For example, if a child node fails to successfully receive a control message 705 in an activated high pathloss mode 735-*b* supporting acknowledgment messaging for resource reservations, as opposed to in a deactivated high pathloss mode 730-*b*, the parent node may be able to successfully retransmit an additional control message 720 and receive the corresponding uplink data transmission 710 with a lower latency shown by the time interval 740-*b*.

Figure 8:
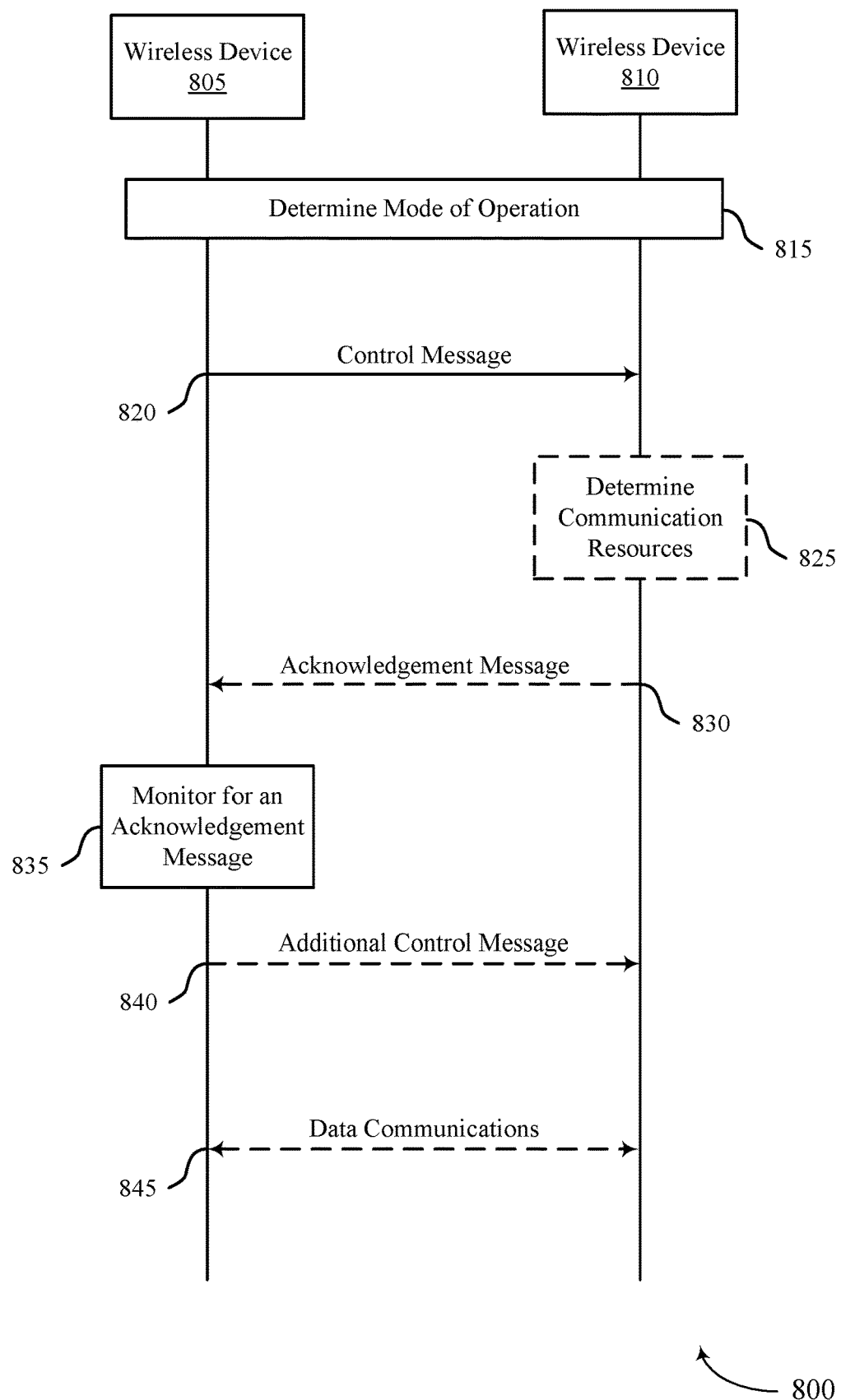
FIG. 8 illustrates a process flow that supports acknowledgment messaging for resource reservations in accordance with one or more aspects of the present disclosure.

FIG. 8 illustrates an example of a process flow 800 that supports acknowledgment messaging for resource reservations in accordance with one or more aspects of the present disclosure. The process flow 800 may illustrate an example of feedback signaling for resource reservations in high pathloss mode operations. For example, wireless device 805 may be an example of any wireless device described with reference to FIGS. 2-6, such as a parent node (e.g., an antecedent relay node 215 or donor node 210). Wireless device 810 may be an example of any wireless device described with reference to FIGS. 2-6, such as a child node (e.g., a descendant relay node 215 or UE 115). In some cases, some processes illustrated as being performed by wireless device 805 may be performed by wireless devices 810, or vice versa. Additionally, alternative examples of the following may be implemented, where some processes may be performed in a different order than described or are not performed at all. In some cases, processes may include additional features not mentioned below, or further operations may be added.

At 815, a wireless device 805, a wireless device 810, or both may determine a mode of operation. For example, wireless device 805 may measure a pathloss of communications with the wireless device 810. The wireless device 805 may determine to switch to a high pathloss mode operation based on the measurement (e.g., if the measured pathloss satisfies or exceeds a pathloss threshold). In some examples, the wireless device 805 may transmit (e.g., to one or more child nodes such as wireless device 810) an indication of the pathloss mode operation. In some examples, wireless device 810 may determine the mode of operation.

At 820, the wireless device 805 may transmit a control message to wireless device 810. The control message may be an example of a control message 505 or a control message 605 as described with reference to FIGS. 5 and 6. The control message may be an example of a control transmission sent via a PDCCH. For example, the wireless device 805 may be an example of a parent node and may transmit the control message to one or more other wireless devices (e.g., wireless device 810), such as child nodes. In some examples, the control message may indicate resources to be utilized for the transmission of a scheduled data transmission (e.g., a PDSCH transmission or a PUSCH transmission). As described herein, the control message may also include (e.g., based on the determined mode of operation) an indication for wireless device 810 to provide feedback (e.g., an acknowledgment message) to the control message.

In some examples, the wireless device 810 may determine communication resources at 825. For example, the wireless device 810 may determine resources for an uplink or downlink data transmission based on the received control message. As described herein, the wireless device 810 may also determine resources for a feedback message (e.g., an acknowledgment or a negative acknowledgment message) in response to the resource reservation. The determined communication resources for the data may be separated in time from the resources used for the control message based on the activated or deactivated pathloss mode. For example, the separation in time may be shorter if the parent node determines to deactivate the high pathloss mode (e.g., if no assignment feedback is sent in between the control message reception and the data communication) to enable more efficient communications if low pathloss is measured, or the separation in time may be longer if the parent node determines to activate the high pathloss mode (e.g., if assignment feedback is scheduled in between the control message reception and the data communication) to enable more reliable communications if high pathloss is measured.

In some examples, the wireless device 810 may transmit an acknowledgment message at 830. For example, the wireless device 810 may transmit a feedback message (e.g., a PUCCH transmission) including feedback (e.g., HARQ feedback such as an ACK or a NACK) in response to the control message. In some examples, the feedback may be transmitted or signaled using HARQ mechanisms similar to the feedback for one or more scheduled data transmissions. For example, the wireless device 810 (e.g., the child node) may transmit the acknowledgment message to the wireless device 805 (e.g., the parent node) to indicate that the wireless device 810 successfully received and decoded the control message at 820. In some examples, the wireless device 810 may determine to transmit the acknowledgment message based on whether the wireless devices are operating in a high pathloss mode. In some examples, the wireless device 810 may determine the resources for transmitting the acknowledgment message based on the received control message (e.g., either implicitly based on other resources or explicitly based on a DCI field).

At 835, the wireless device 805 may monitor for an acknowledgment message. For example, the wireless device 805 may monitor for the acknowledgment message during a monitoring window. The monitoring window may include the time resources indicated or otherwise allocated to the wireless device 810 for the transmission of the acknowledgment message (e.g., where the parent node monitors in time resources prior to the scheduled data transmission). The wireless device 805 may monitor for the feedback in specific frequency resources based on an implicit or explicit allocation, and the wireless device 810 may identify these frequency resources and transmit any feedback in the identified resources. In some cases, the wireless device 805 may determine that the control message was lost or otherwise not received at wireless device 810 (e.g., due to high pathloss or blocking). The wireless device 805 may determine that the control message was not successfully received by wireless device 810 based on receiving a negative acknowledgment message, failing to receive an acknowledgment message in the monitoring window, failing to detect the start of a data transmission (e.g., a PUSCH transmission), or any combination thereof. In such cases, the wireless device 805 may determine to transmit an additional control message, or retransmit the control message, or both, at 840. The additional or retransmitted control message may indicate additional reserved resources for the data transmission (e.g., based on the determined pathloss mode). The reserved resources indicated by the additional control message may be separated in time from the resources used by the additional control message based on the activated or deactivated pathloss mode. For example, the separation in time may be shorter if the parent node determines to deactivate the high pathloss mode (e.g., to enable more efficient communications if low pathloss is measured), or the separation in time may be longer if the parent node determines to activate the high pathloss mode (e.g., to enable more reliable communications if high pathloss is measured). However, the retransmission of the control message in the high pathloss mode may occur in time resources originally reserved for the data communications, while control message retransmissions in the normal mode may occur in time resources following the resources reserved for data communications.

In some examples, the wireless device 810 may receive a message that the control message (e.g., including a resource reservation for the data transmission) was successfully received at wireless device 810. In such examples, the wireless device 805 may perform communications with wireless device 810 in the reserved resources (e.g., transmit or monitor for a scheduled downlink or uplink data transmission) at 845.

Figure 9:
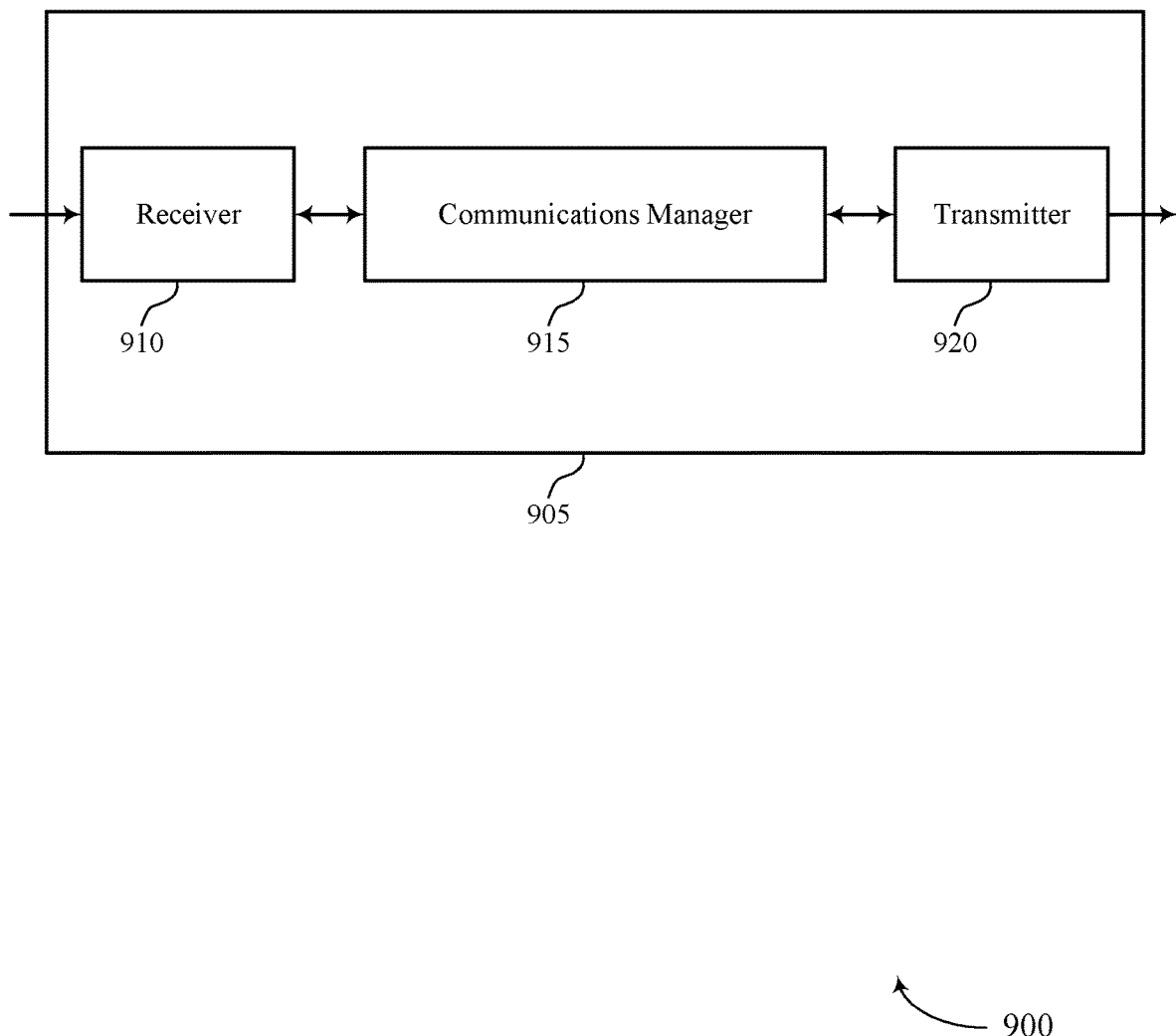
FIGS. 9 and 10 show block diagrams of devices that support acknowledgment messaging for resource reservations in accordance with one or more aspects of the present disclosure.

FIG. 9 shows a block diagram 900 of a device 905 that supports acknowledgment messaging for resource reservations in accordance with one or more aspects of the present disclosure. The device 905 may be an example of aspects of a UE 115 or a base station 105 as described herein. For example, the device 905 may be an example of a child node in an IAB system. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to acknowledgment messaging for resource reservations, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may be implemented by a first wireless device. The communications manager 915 may receive, from a second wireless device, a control message on a PDCCH, where the control message includes a resource reservation for communication with the second wireless device, transmit, to the second wireless device, an acknowledgment message on a PUCCH, where the acknowledgment message acknowledges successful reception of the resource reservation at the first wireless device, and communicate with the second wireless device based on the resource reservation. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
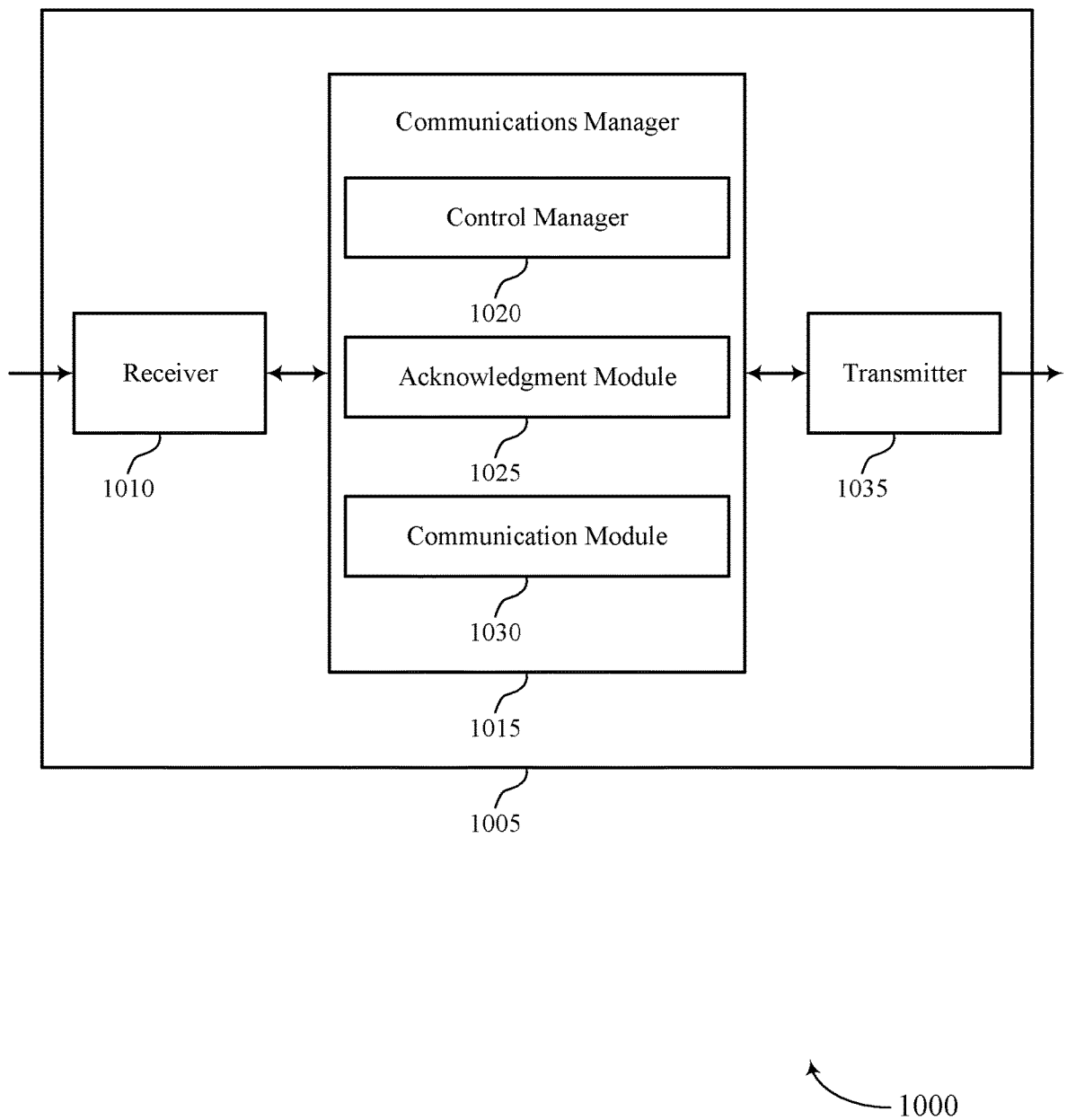

FIG. 10 shows a block diagram 1000 of a device 1005 that supports acknowledgment messaging for resource reservations in accordance with one or more aspects of the present disclosure. The device 1005 may be an example of aspects of a device 905, a base station 105, or a UE 115 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to acknowledgment messaging for resource reservations, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a control manager 1020, an acknowledgment module 1025, and a communication module 1030. The communications manager 1015 may be an example of aspects of the communications manager 1210 described herein and may be implemented by a first wireless device (e.g., a child node).

The control manager 1020 may receive, from a second wireless device (e.g., a parent node), a control message on a PDCCH, where the control message includes a resource reservation for communication with the second wireless device. The acknowledgment module 1025 may transmit, to the second wireless device, an acknowledgment message on a PUCCH, where the acknowledgment message acknowledges successful reception of the resource reservation at the first wireless device. The communication module 1030 may communicate with the second wireless device based on the resource reservation.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
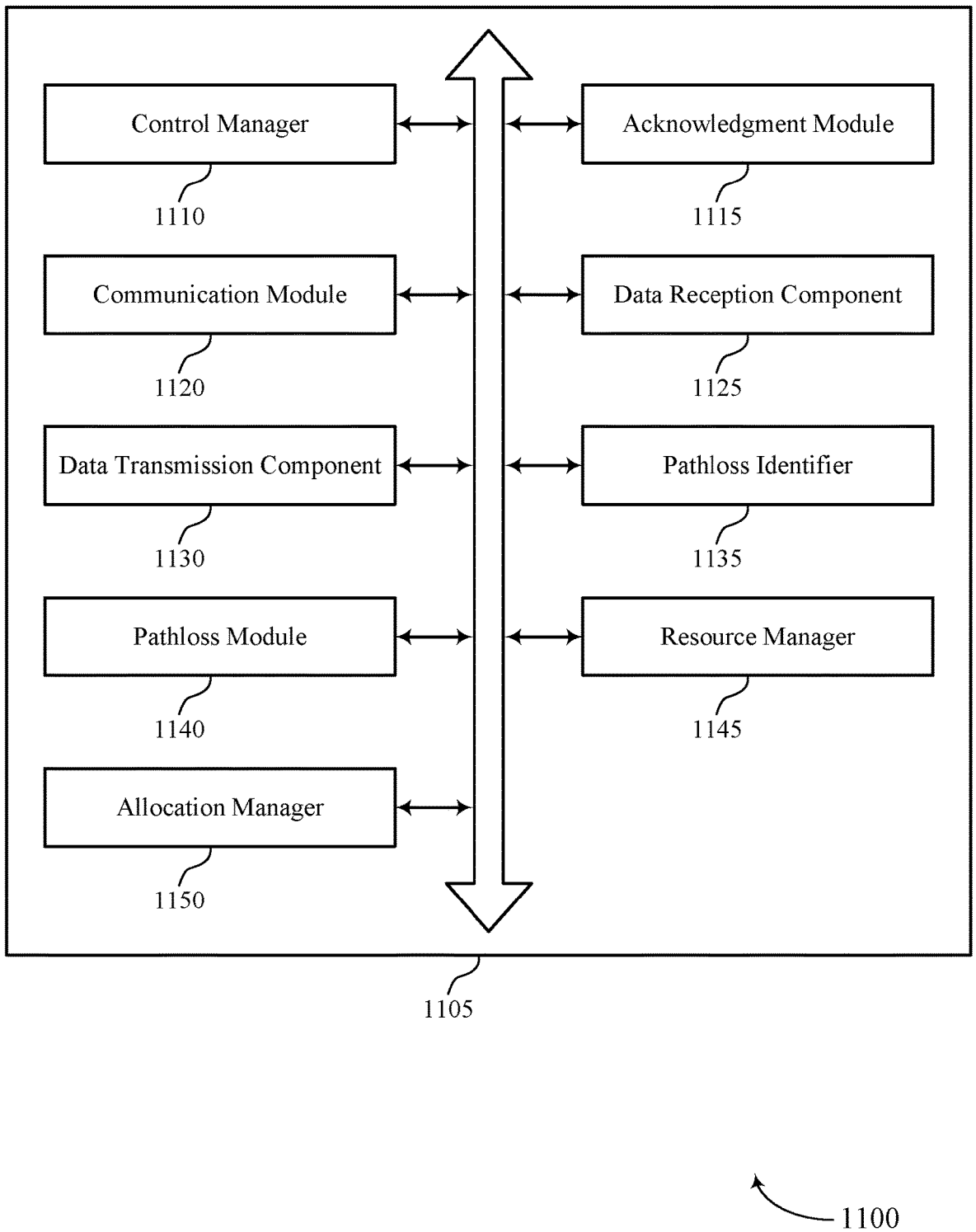
FIG. 11 shows a block diagram of a communications manager that supports acknowledgment messaging for resource reservations in accordance with one or more aspects of the present disclosure.

FIG. 11 shows a block diagram 1100 of a communications manager 1105 that supports acknowledgment messaging for resource reservations in accordance with one or more aspects of the present disclosure. The communications manager 1105 may be an example of aspects of a communications manager 915, a communications manager 1015, or a communications manager 1210 described herein. The communications manager 1105 may include a control manager 1110, an acknowledgment module 1115, a communication module 1120, a data reception component 1125, a data transmission component 1130, a pathloss identifier 1135, a pathloss module 1140, a resource manager 1145, and an allocation manager 1150. Each of these modules may communicate, directly or indirectly, with one another (e.g., via one or more buses). Each of these modules may be implemented by a first wireless device (e.g., a child node).

The control manager 1110 may receive, from a second wireless device, a control message on a PDCCH, where the control message includes a resource reservation for communication with the second wireless device.

The acknowledgment module 1115 may transmit, to the second wireless device, an acknowledgment message on a PUCCH, where the acknowledgment message acknowledges successful reception of the resource reservation at the first wireless device. In some examples, the acknowledgment module 1115 may transmit the acknowledgment message in an acknowledgment resource subsequent to a first resource in which the control message is received and prior to a reserved resource corresponding to the resource reservation.

The communication module 1120 may communicate with the second wireless device based on the resource reservation. In some examples, the resource reservation may reserve a downlink resource on a PDSCH. In some of these examples, the data reception component 1125 may receive, from the second wireless device, a data message in the reserved downlink resource on the PDSCH. In other examples, the resource reservation may reserve an uplink resource on a PUSCH. In some of these examples, the data transmission component 1130 may transmit, to the second wireless device, a data message in the reserved uplink resource on the PUSCH.

The pathloss identifier 1135 may identify that a first mode (e.g., a high pathloss mode) is activated, where the transmitting the acknowledgment message is based on the activated first mode. In some cases, the pathloss module 1140 may deactivate the first mode based on a measurement (e.g., a pathloss measurement). In some of these cases, the control manager 1110 may receive, from the second wireless device, an additional control message on the PDCCH, where the additional control message includes an additional resource reservation for communication with the second wireless device. The communication module 1120 may communicate with the second wireless device based on the additional resource reservation (e.g., without sending feedback for the resource reservation).

The resource manager 1145 may determine the acknowledgment resource based on the first resource in which the control message is received or the reserved resource corresponding to the resource reservation or both. The allocation manager 1150 may determine the acknowledgment resource based on an acknowledgment resource allocation in the control message.

Figure 12:
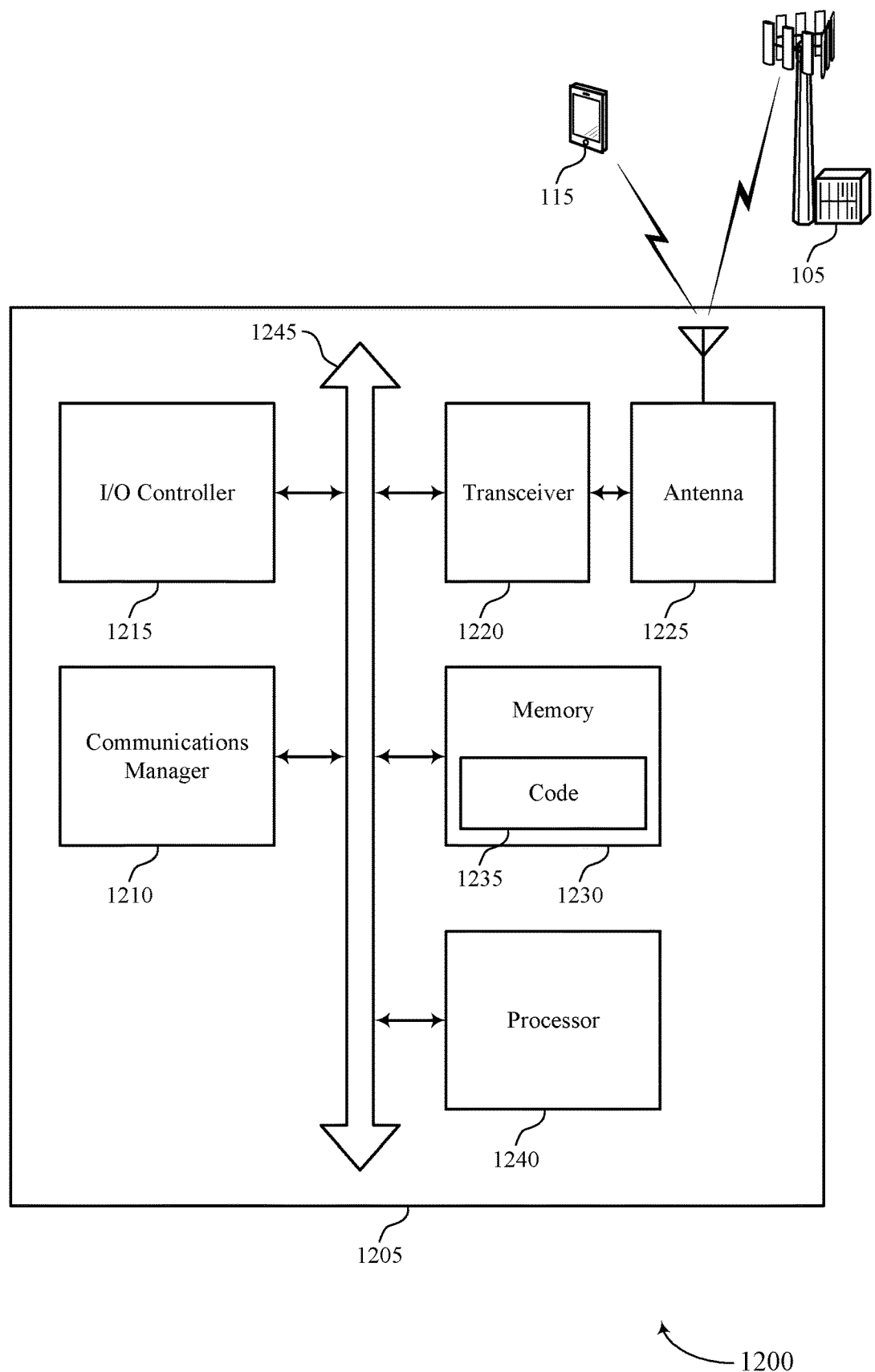
FIG. 12 shows a diagram of a system including a device that supports acknowledgment messaging for resource reservations in accordance with one or more aspects of the present disclosure.

FIG. 12 shows a diagram of a system 1200 including a device 1205 that supports acknowledgment messaging for resource reservations in accordance with one or more aspects of the present disclosure. The device 1205 may be an example of or include the components of device 905, device 1005, a base station 105, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The device 1205 may be an example of a first wireless device (e.g., a child node). The communications manager 1210 may receive, from a second wireless device, a control message on a PDCCH, where the control message includes a resource reservation for communication with the second wireless device, transmit, to the second wireless device, an acknowledgment message on a PUCCH, where the acknowledgment message acknowledges successful reception of the resource reservation at the first wireless device, and communicate with the second wireless device based on the resource reservation.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting acknowledgment messaging for resource reservations).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
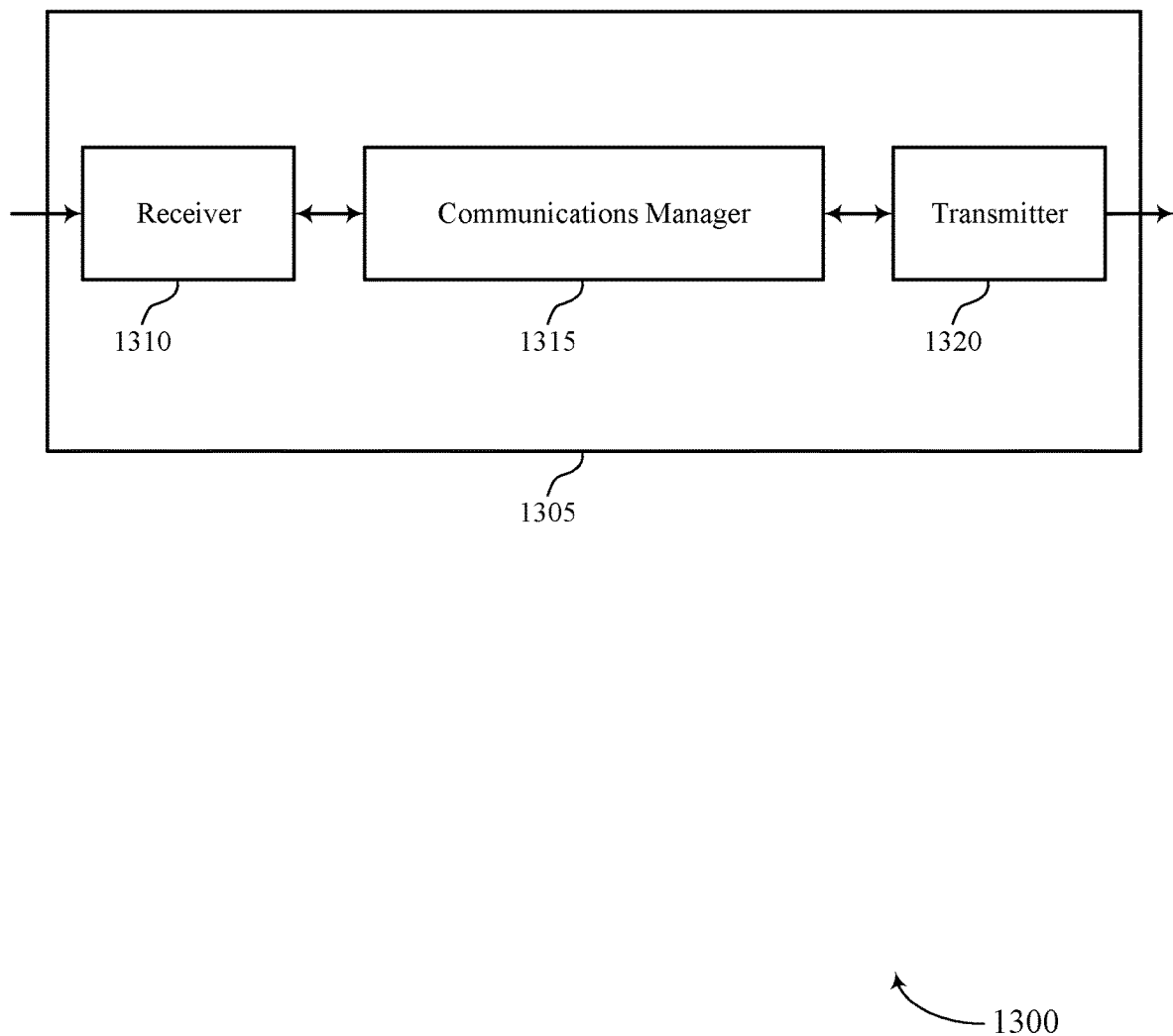
FIGS. 13 and 14 show block diagrams of devices that support acknowledgment messaging for resource reservations in accordance with one or more aspects of the present disclosure.

FIG. 13 shows a block diagram 1300 of a device 1305 that supports acknowledgment messaging for resource reservations in accordance with one or more aspects of the present disclosure. The device 1305 may be an example of aspects of a UE 115 or a base station 105 as described herein. For example, the device 1305 may be an example of a parent node in an IAB system. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to acknowledgment messaging for resource reservations, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may be implemented by a first wireless device. The communications manager 1315 may transmit, to a second wireless device, a control message on a PDCCH, where the control message includes a resource reservation for communication with the second wireless device, monitor a PUCCH for an acknowledgment message acknowledging successful reception of the resource reservation at the second wireless device, and communicate with the second wireless device based on whether the acknowledgment message is received. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
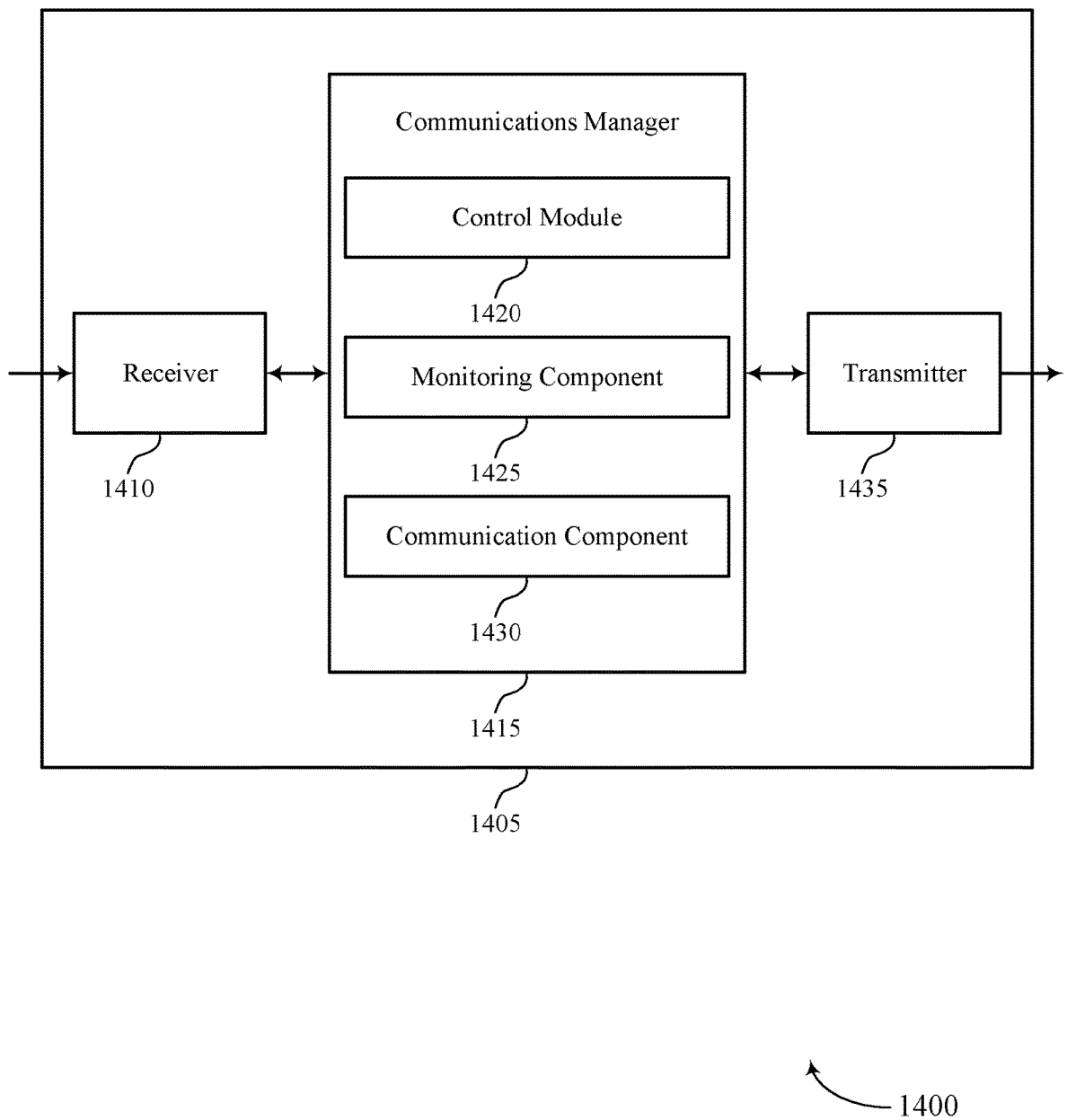

FIG. 14 shows a block diagram 1400 of a device 1405 that supports acknowledgment messaging for resource reservations in accordance with one or more aspects of the present disclosure. The device 1405 may be an example of aspects of a device 1305 or a base station 105 as described herein. The device 1405 may include a receiver 1410, a communications manager 1415, and a transmitter 1435. The device 1405 may also include a processor. Each of these components may be in communication with one another (e.g., via one or more buses).

The receiver 1410 may receive information such as packets, user data, or control information associated with various information channels (e.g., control channels, data channels, and information related to acknowledgment messaging for resource reservations, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a control module 1420, a monitoring component 1425, and a communication component 1430. The communications manager 1415 may be an example of aspects of the communications manager 1610 described herein and may be implemented by a first wireless device (e.g., a parent node).

The control module 1420 may transmit, to a second wireless device (e.g., a child node), a control message on a PDCCH, where the control message includes a resource reservation for communication with the second wireless device. The monitoring component 1425 may monitor a PUCCH for an acknowledgment message acknowledging successful reception of the resource reservation at the second wireless device. The communication component 1430 may communicate with the second wireless device based on whether the acknowledgment message is received.

The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 1620 described with reference to FIG. 16. The transmitter 1435 may utilize a single antenna or a set of antennas.

Figure 15:
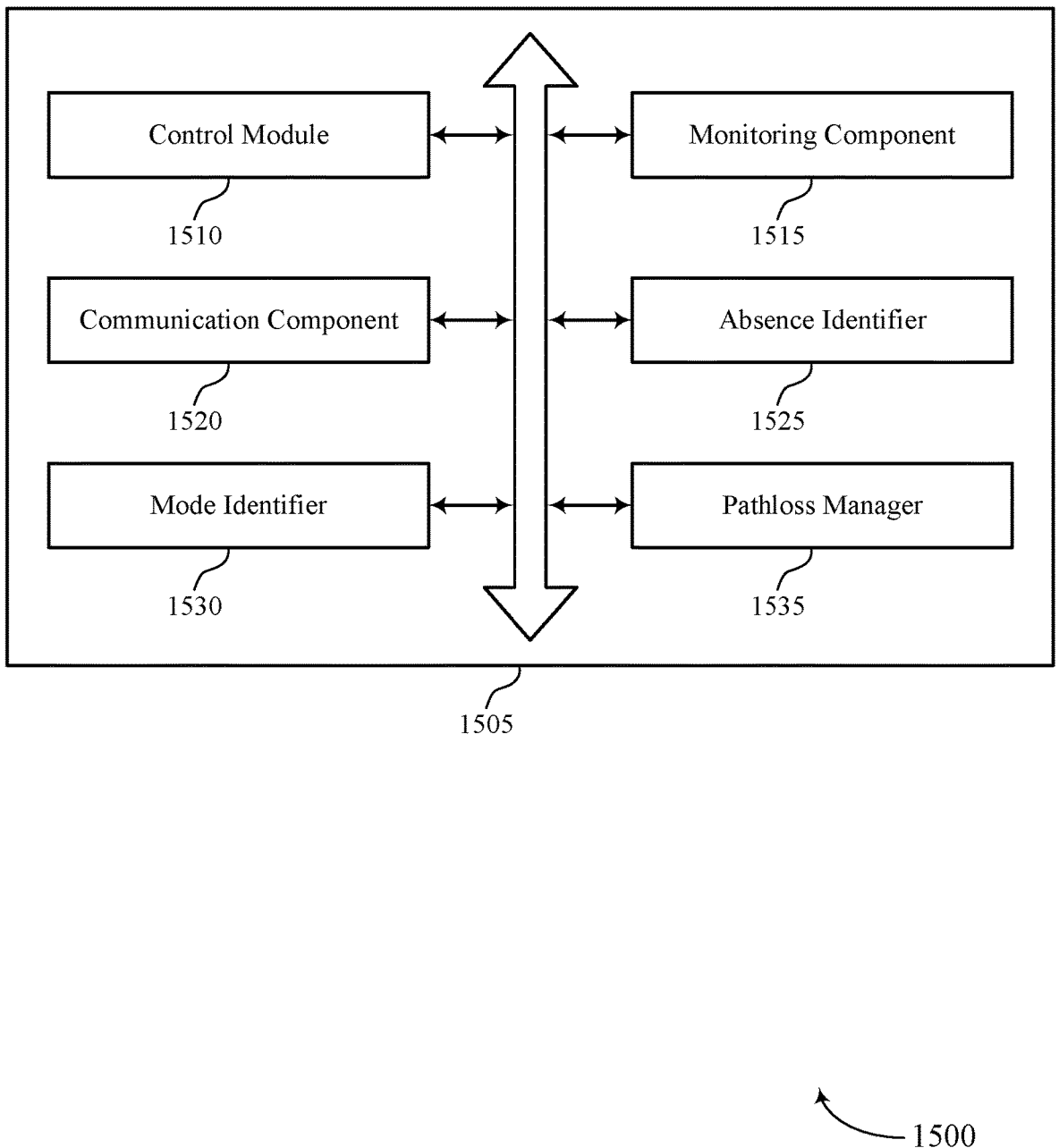
FIG. 15 shows a block diagram of a communications manager that supports acknowledgment messaging for resource reservations in accordance with one or more aspects of the present disclosure.

FIG. 15 shows a block diagram 1500 of a communications manager 1505 that supports acknowledgment messaging for resource reservations in accordance with one or more aspects of the present disclosure. The communications manager 1505 may be an example of aspects of a communications manager 1315, a communications manager 1415, or a communications manager 1610 described herein. The communications manager 1505 may include a control module 1510, a monitoring component 1515, a communication component 1520, an absence identifier 1525, a mode identifier 1530, and a pathloss manager 1535. Each of these modules may communicate, directly or indirectly, with one another (e.g., via one or more buses). Each of these module may be implemented by a first wireless device (e.g., a parent node).

The control module 1510 may transmit, to a second wireless device, a control message on a PDCCH, where the control message includes a resource reservation for communication with the second wireless device. In some cases, the control message indicates an acknowledgment resource for receiving an acknowledgment message.

The monitoring component 1515 may monitor a PUCCH for an acknowledgment message acknowledging successful reception of the resource reservation at the second wireless device. In some examples, the monitoring component 1515 may monitor for the acknowledgment message in a monitoring window between a first resource in which the control message is transmitted and a reserved resource corresponding to the resource reservation. In some examples, the monitoring component 1515 may determine a starting point of the monitoring window, an ending point of the monitoring window, or both based at least in part on a configuration of the first wireless device.

The communication component 1520 may communicate with the second wireless device based on whether the acknowledgment message is received. In some cases, the absence identifier 1525 may identify an absence of the acknowledgment message within a monitoring window based on the monitoring. In some of these cases, the communicating may include transmitting, to the second wireless device, an additional control message on the PDCCH based on the identifying the absence of the acknowledgment message, where the additional control message includes an additional resource reservation for communication with the second wireless device. In some examples the resource reservation may reserve a downlink resource on a PDSCH. In some of these examples, the communication component 1520 may receive the acknowledgment message in response to the control message based on the monitoring, where the communicating involves transmitting, to the second wireless device, a data message in the reserved downlink resource on the PDSCH. In some examples, the resource reservation may reserve an uplink resource on a PUSCH. In some of these examples, the communication component 1520 may receive the acknowledgment message in response to the control message based on the monitoring, where the communicating involves receiving, from the second wireless device, a data message in the reserved uplink resource on the PUSCH.

The mode identifier 1530 may identify that a first mode (e.g., a high pathloss mode) is activated, where the monitoring is based on the activated first mode. In some cases, the pathloss manager 1535 may deactivate the first mode based on a measurement (e.g., a pathloss measurement). In some of these cases, the control message may be transmitted in a first resource separated in time from a reserved resource corresponding to the resource reservation by a first time gap, and the control module 1510 may transmit, to the second wireless device, an additional control message in a second resource on the PDCCH, where the additional control message includes an additional resource reservation reserving an additional reserved resource separated in time from the second resource by a second time gap shorter than the first time gap based on the deactivated first mode.

Figure 16:
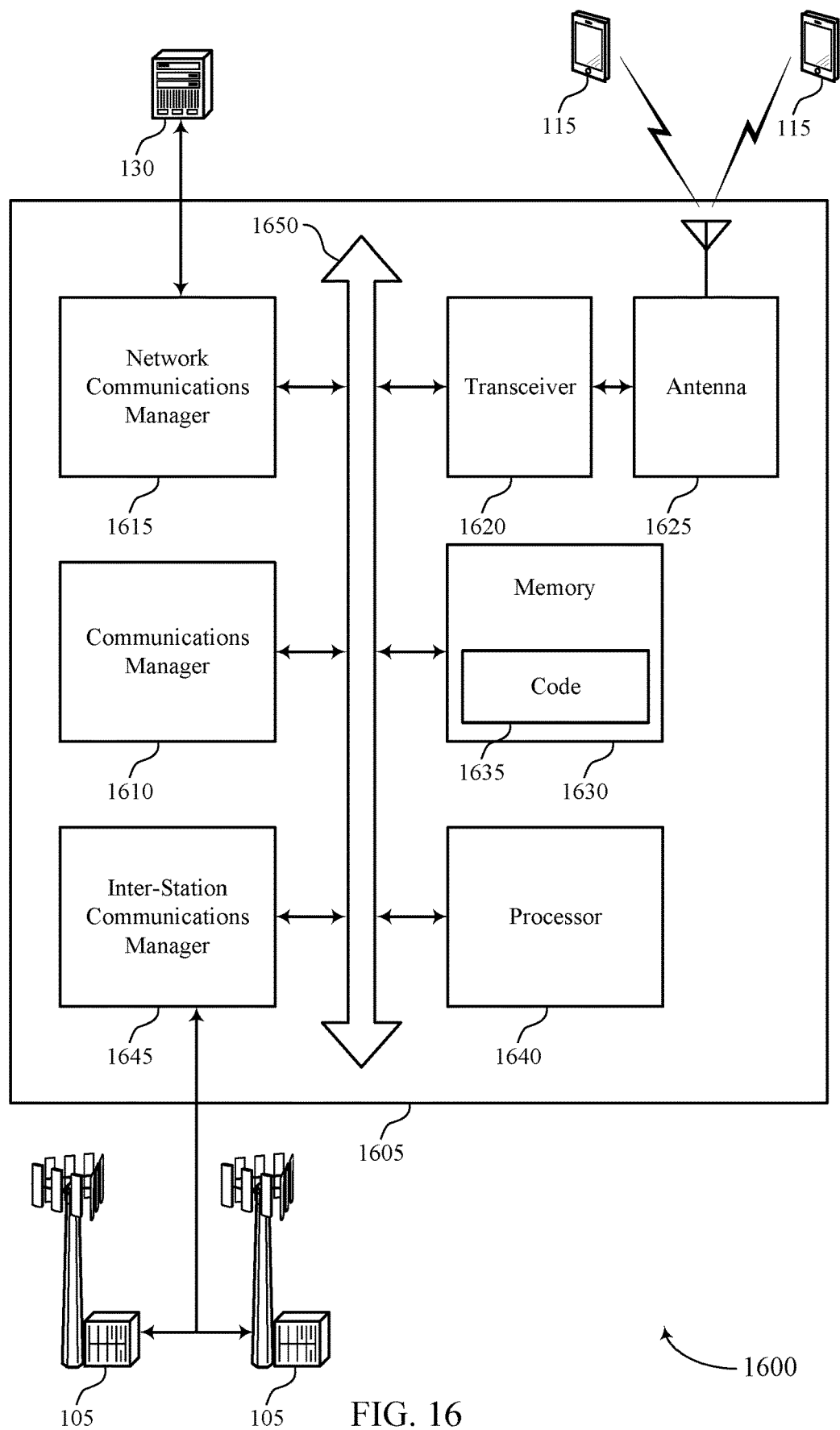
FIG. 16 shows a diagram of a system including a device that supports acknowledgment messaging for resource reservations in accordance with one or more aspects of the present disclosure.

FIG. 16 shows a diagram of a system 1600 including a device 1605 that supports acknowledgment messaging for resource reservations in accordance with one or more aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The device 1605 may be an example of a first wireless device (e.g., a parent node). The communications manager 1610 may transmit, to a second wireless device, a control message on a PDCCH, where the control message includes a resource reservation for communication with the second wireless device, monitor a PUCCH for an acknowledgment message acknowledging successful reception of the resource reservation at the second wireless device, and communicate with the second wireless device based on whether the acknowledgment message is received.

The network communications manager 1615 may manage communications with the core network 130 (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting acknowledgment messaging for resource reservations).

The inter-station communications manager 1645 may manage communications with other base station 105 and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
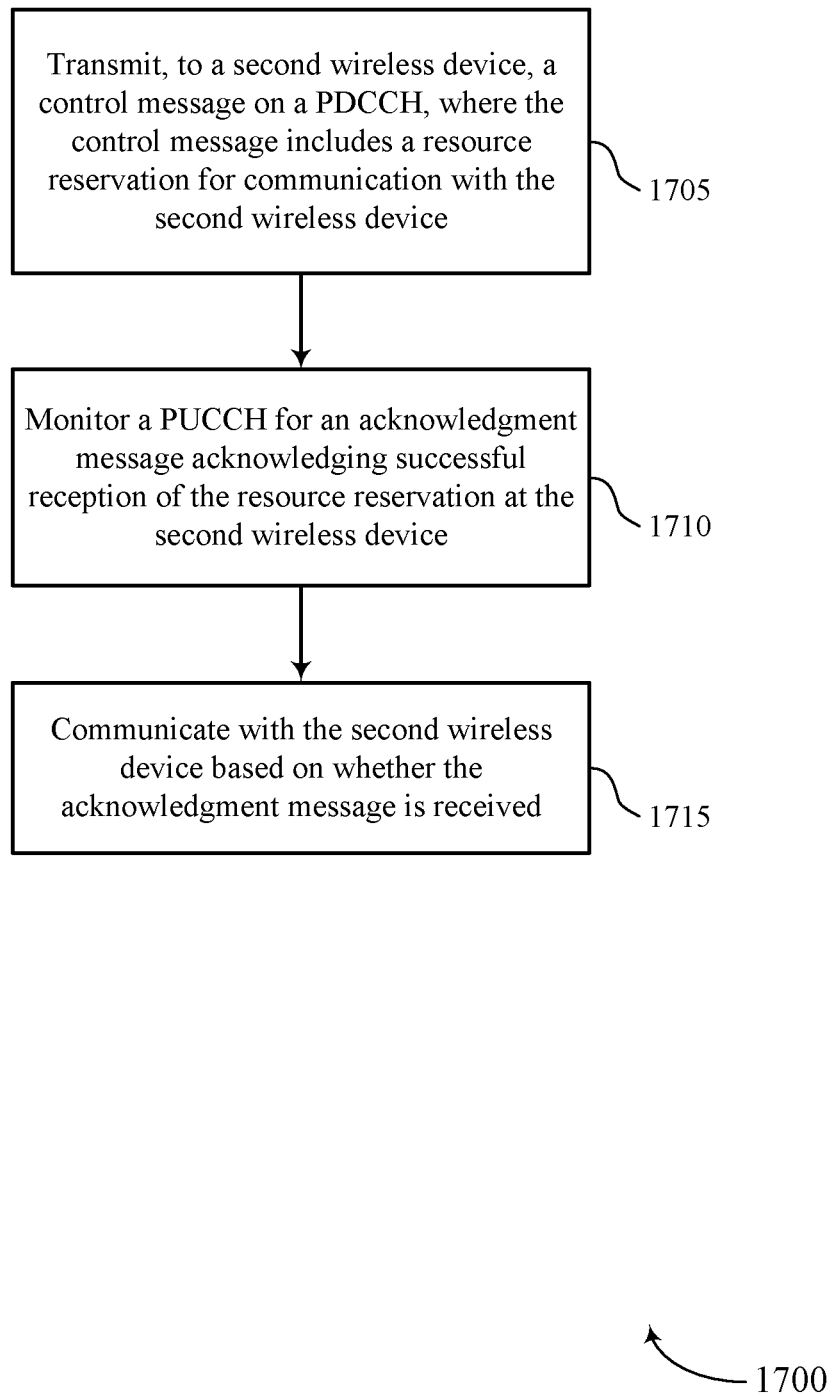
FIGS. 17 through 21 show flowcharts illustrating methods that support acknowledgment messaging for resource reservations in accordance with one or more aspects of the present disclosure.

FIG. 17 shows a flowchart illustrating a method 1700 that supports acknowledgment messaging for resource reservations in accordance with one or more aspects of the present disclosure. The operations of method 1700 may be implemented by a parent node (e.g., a base station 105 or UE 115) or its components as described herein. For example, the operations of method 1700 may be performed by a communications manager as described with reference to FIGS. 13 through 16. In some examples, a parent node may execute a set of instructions to control the functional elements of the parent node to perform the functions described below. Additionally or alternatively, a parent node may perform aspects of the functions described below using special-purpose hardware.

At 1705, the parent node (e.g., a first wireless device) may transmit, to a second wireless device, a control message on a PDCCH, where the control message includes a resource reservation for communication with the second wireless device. The operations of 1705 may be performed according to the methods described herein. In some examples, aspects of the operations of 1705 may be performed by a control module as described with reference to FIGS. 13 through 16.

At 1710, the parent node may monitor a PUCCH for an acknowledgment message acknowledging successful reception of the resource reservation at the second wireless device. The operations of 1710 may be performed according to the methods described herein. In some examples, aspects of the operations of 1710 may be performed by a monitoring component as described with reference to FIGS. 13 through 16.

At 1715, the parent node may communicate with the second wireless device based on whether the acknowledgment message is received. In some examples, the resource reservation may reserve a downlink resource on a PDSCH. In such examples, the parent node may receive the acknowledgment message in response to the control message based on the monitoring, and the communicating may include transmitting, to the second wireless device, a data message in the reserved downlink resource on the PDSCH. In other examples, the resource reservation may reserve an uplink resource on a PUSCH. In such examples, the parent node may receive the acknowledgment message in response to the control message based on the monitoring, and the communicating may include receiving, from the second wireless device, a data message in the reserved uplink resource on the PUSCH. The operations of 1715 may be performed according to the methods described herein. In some examples, aspects of the operations of 1715 may be performed by a communication component as described with reference to FIGS. 13 through 16.

Figure 18:
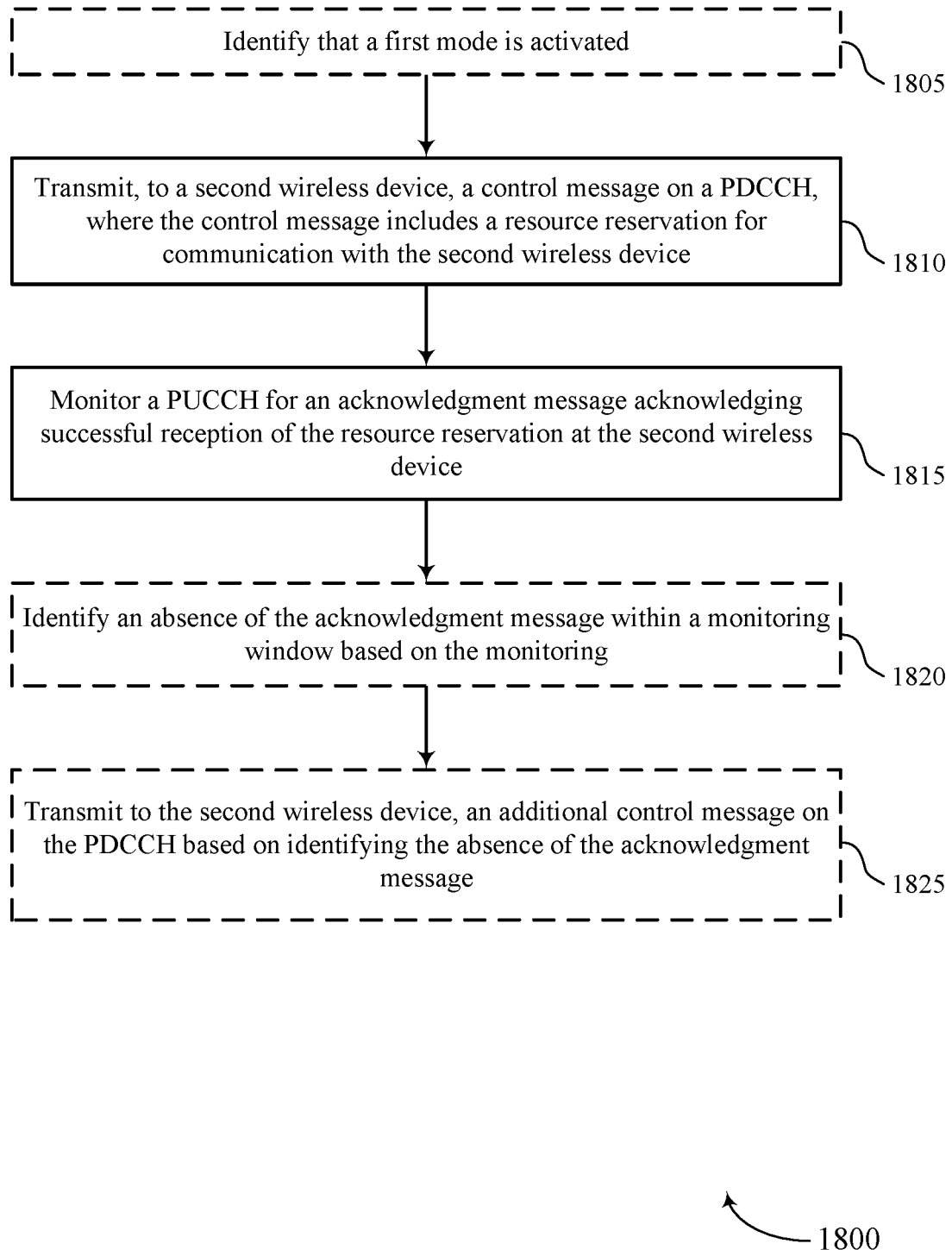

FIG. 18 shows a flowchart illustrating a method 1800 that supports acknowledgment messaging for resource reservations in accordance with one or more aspects of the present disclosure. The operations of method 1800 may be implemented by a parent node (e.g., a base station 105 or UE 115) or its components as described herein. For example, the operations of method 1800 may be performed by a communications manager as described with reference to FIGS. 13 through 16. In some examples, a parent node may execute a set of instructions to control the functional elements of the parent node to perform the functions described below. Additionally or alternatively, a parent node may perform aspects of the functions described below using special-purpose hardware.

At 1805, the parent node (e.g., a first wireless device) may identify that a first mode (e.g., a high pathloss mode) is activated. The operations of 1805 may be performed according to the methods described herein. In some examples, aspects of the operations of 1805 may be performed by a mode identifier as described with reference to FIGS. 13 through 16.

At 1810, the parent node may transmit, to a second wireless device, a control message on a PDCCH, where the control message includes a resource reservation for communication with the second wireless device. The operations of 1810 may be performed according to the methods described herein. In some examples, aspects of the operations of 1810 may be performed by a control module as described with reference to FIGS. 13 through 16.

At 1815, the parent node may monitor a PUCCH for an acknowledgment message acknowledging successful reception of the resource reservation at the second wireless device. The operations of 1815 may be performed according to the methods described herein. In some examples, aspects of the operations of 1815 may be performed by a monitoring component as described with reference to FIGS. 13 through 16.

At 1820, the parent node may identify an absence of the acknowledgment message within a monitoring window based on the monitoring. The operations of 1820 may be performed according to the methods described herein. In some examples, aspects of the operations of 1820 may be performed by an absence identifier as described with reference to FIGS. 13 through 16.

At 1825, the parent node may communicate with the second wireless device based on whether the acknowledgment message is received. In some examples, the communicating may include transmitting, to the second wireless device, an additional control message on the PDCCH based on the identifying the absence of the acknowledgment message, where the additional control message includes an additional resource reservation for communication with the second wireless device. The operations of 1825 may be performed according to the methods described herein. In some examples, aspects of the operations of 1825 may be performed by a communication component as described with reference to FIGS. 13 through 16.

Figure 19:
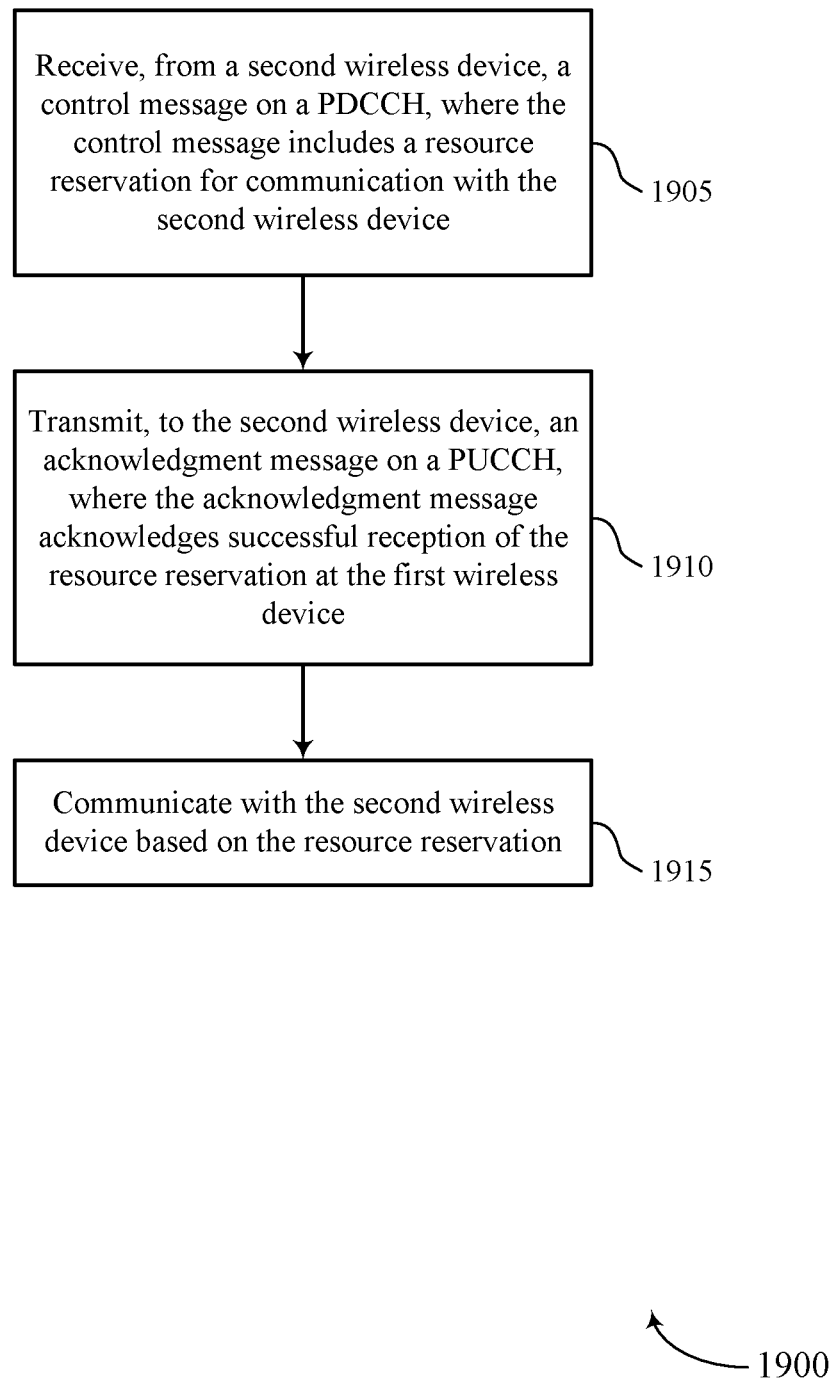

FIG. 19 shows a flowchart illustrating a method 1900 that supports acknowledgment messaging for resource reservations in accordance with one or more aspects of the present disclosure. The operations of method 1900 may be implemented by a child node (e.g., a base station 105 or a UE 115) or its components as described herein. For example, the operations of method 1900 may be performed by a communications manager as described with reference to FIGS. 9 through 12. In some examples, a child node may execute a set of instructions to control the functional elements of the child node to perform the functions described below. Additionally or alternatively, a child node may perform aspects of the functions described below using special-purpose hardware.

At 1905, the child node (e.g., a first wireless device) may receive, from a second wireless device, a control message on a PDCCH, where the control message includes a resource reservation for communication with the second wireless device. The operations of 1905 may be performed according to the methods described herein. In some examples, aspects of the operations of 1905 may be performed by a control manager as described with reference to FIGS. 9 through 12.

At 1910, the child node may transmit, to the second wireless device, an acknowledgment message on a PUCCH, where the acknowledgment message acknowledges successful reception of the resource reservation at the first wireless device. The operations of 1910 may be performed according to the methods described herein. In some examples, aspects of the operations of 1910 may be performed by an acknowledgment module as described with reference to FIGS. 9 through 12.

At 1915, the child node may communicate with the second wireless device based on the resource reservation. In some examples, the resource reservation may reserve a downlink resource on a PDSCH. In such examples, the child node may receive, from the second wireless device, a data message in the reserved downlink resource on the PDSCH. In other examples, the resource reservation may reserve an uplink resource on a PUSCH. In such examples, the child node may transmit, to the second wireless device, a data message in the reserved uplink resource on the PUSCH. The operations of 1915 may be performed according to the methods described herein. In some examples, aspects of the operations of 1915 may be performed by a communication module as described with reference to FIGS. 9 through 12.

Figure 20:
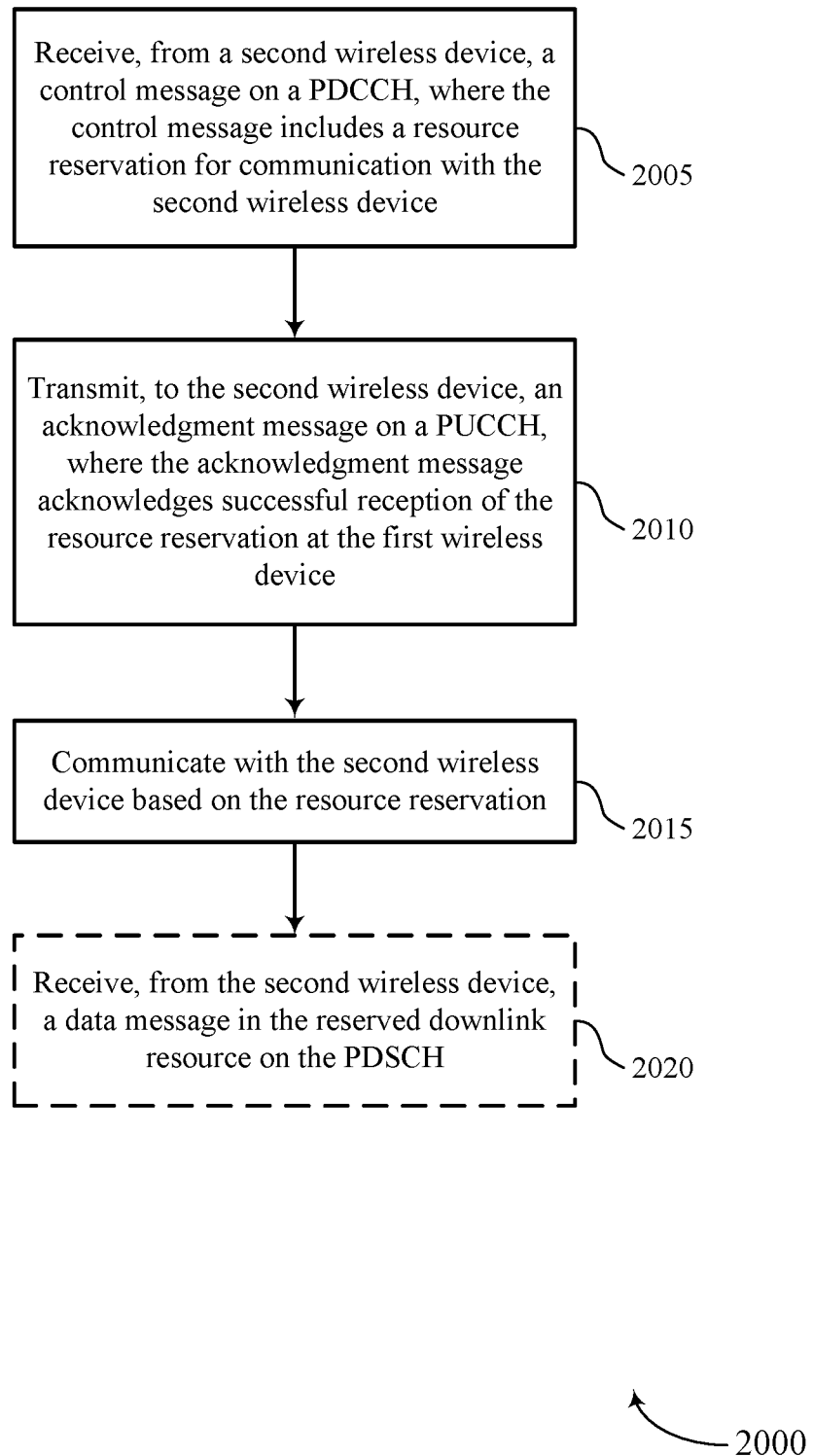

FIG. 20 shows a flowchart illustrating a method 2000 that supports acknowledgment messaging for resource reservations in accordance with one or more aspects of the present disclosure. The operations of method 2000 may be implemented by a child node (e.g., a base station 105 or UE 115) or its components as described herein. For example, the operations of method 2000 may be performed by a communications manager as described with reference to FIGS. 9 through 12. In some examples, a child node may execute a set of instructions to control the functional elements of the child node to perform the functions described below. Additionally or alternatively, a child node may perform aspects of the functions described below using special-purpose hardware.

At 2005, the child node (e.g., a first wireless device) may receive, from a second wireless device, a control message on a PDCCH, where the control message includes a resource reservation for communication with the second wireless device. The operations of 2005 may be performed according to the methods described herein. In some examples, aspects of the operations of 2005 may be performed by a control manager as described with reference to FIGS. 9 through 12.

At 2010, the child node may transmit, to the second wireless device, an acknowledgment message on a PUCCH, where the acknowledgment message acknowledges successful reception of the resource reservation at the first wireless device. The operations of 2010 may be performed according to the methods described herein. In some examples, aspects of the operations of 2010 may be performed by an acknowledgment module as described with reference to FIGS. 9 through 12.

At 2015, the child node may communicate with the second wireless device based on the resource reservation. The operations of 2015 may be performed according to the methods described herein. In some examples, aspects of the operations of 2015 may be performed by a communication module as described with reference to FIGS. 9 through 12.

At 2020, the child node may receive, from the second wireless device, a data message in the resource reservation (e.g., a reserved downlink resource on the PDSCH). The operations of 2025 may be performed according to the methods described herein. In some examples, aspects of the operations of 2025 may be performed by a data reception component module as described with reference to FIGS. 9 through 12.

Figure 21:
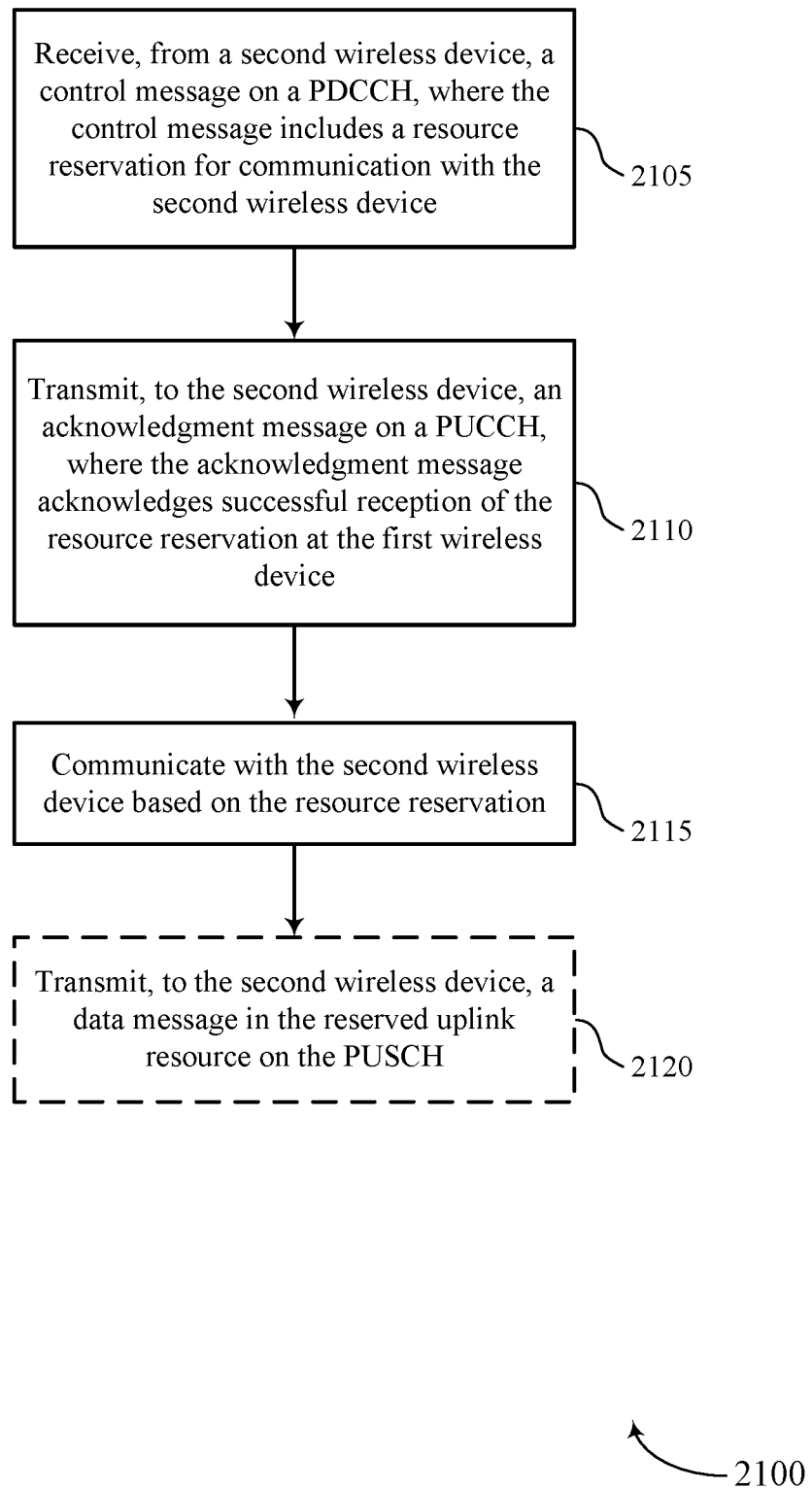

FIG. 21 shows a flowchart illustrating a method 2100 that supports acknowledgment messaging for resource reservations in accordance with one or more aspects of the present disclosure. The operations of method 2100 may be implemented by a child node (e.g., a base station 105 or a UE 115) or its components as described herein. For example, the operations of method 2100 may be performed by a communications manager as described with reference to FIGS. 9 through 12. In some examples, a child node may execute a set of instructions to control the functional elements of the child node to perform the functions described below. Additionally or alternatively, a child node may perform aspects of the functions described below using special-purpose hardware.

At 2105, the child node may receive, from a second wireless device, a control message on a PDCCH, where the control message includes a resource reservation for communication with the second wireless device. The operations of 2105 may be performed according to the methods described herein. In some examples, aspects of the operations of 2105 may be performed by a control manager as described with reference to FIGS. 9 through 12.

At 2110, the child node may transmit, to the second wireless device, an acknowledgment message on a PUCCH, where the acknowledgment message acknowledges successful reception of the resource reservation at the first wireless device. The operations of 2110 may be performed according to the methods described herein. In some examples, aspects of the operations of 2110 may be performed by an acknowledgment module as described with reference to FIGS. 9 through 12.

At 2115, the child node may communicate with the second wireless device based on the resource reservation. The operations of 2115 may be performed according to the methods described herein. In some examples, aspects of the operations of 2115 may be performed by a communication module as described with reference to FIGS. 9 through 12.

At 2120, the child node may transmit, to the second wireless device, a data message in the resource reservation (e.g., a reserved uplink resource on the PUSCH). The operations of 2120 may be performed according to the methods described herein. In some examples, aspects of the operations of 2120 may be performed by a data transmission component as described with reference to FIGS. 9 through 12.

Described below are a number of examples of methods, systems or apparatuses including means for implementing methods or realizing apparatuses, non-transitory computer-readable medium storing instructions executable by one or more processors to cause the one or more processors to implement methods, and systems including one or more processors and memory coupled with the one or more processors storing instructions executable by the one or more processors to cause the system or apparatus to implement methods. It is to be understood that these are just some examples of possible examples, and other examples will be readily apparent to those skilled in the art without departing from the scope of the disclosure.

Example 1: A method for wireless communications at a first wireless device, comprising: transmitting, to a second wireless device, a control message on a physical downlink control channel, wherein the control message comprises a resource reservation for communication with the second wireless device; transmitting, to a second wireless device, a control message on a physical downlink control channel, wherein the control message comprises a resource reservation for communication with the second wireless device; and communicating with the second wireless device based at least in part on whether the acknowledgment message is received.

Example 2: The method of example 1, further comprising: identifying an absence of the acknowledgment message within a monitoring window based at least in part on the monitoring.

Example 3: The method of examples 1 or 2, wherein the communicating comprises: transmitting, to the second wireless device, an additional control message on the physical downlink control channel based at least in part on the identifying the absence of the acknowledgment message, wherein the additional control message comprises an additional resource reservation for communication with the second wireless device.

Example 4: The method of any of examples 1 through 3, wherein the resource reservation reserves a downlink resource on a physical downlink shared channel, the method further comprising: receiving the acknowledgment message in response to the control message based at least in part on the monitoring, wherein the communicating comprises transmitting, to the second wireless device, a data message in the reserved downlink resource on the physical downlink shared channel.

Example 5: The method of examples 1 through 4, wherein the resource reservation reserves an uplink resource on a physical uplink shared channel, the method further comprising: receiving the acknowledgment message in response to the control message based at least in part on the monitoring, wherein the communicating comprises receiving, from the second wireless device, a data message in the reserved uplink resource on the physical uplink shared channel.

Example 6: The method of examples 1 through 4, wherein the monitoring comprises: monitoring for the acknowledgment message in a monitoring window between a first resource in which the control message is transmitted and a reserved resource corresponding to the resource reservation.

Example 7: The method of any of examples 1 through 6, further comprising: determining a starting point of the monitoring window, an ending point of the monitoring window, or both based at least in part on a configuration of the first wireless device.

Example 8: The method of any of examples 1 through 7, further comprising: determining that a first mode is activated, wherein the monitoring is based at least in part on the activated first mode.

Example 9: The method of any of examples 1 through 8, wherein the control message is transmitted in a first resource separated in time from a reserved resource corresponding to the resource reservation by a first time gap, the method further comprising: deactivating the first mode based at least in part on a measurement; and transmitting, to the second wireless device, an additional control message in a second resource on the physical downlink control channel, wherein the additional control message comprises an additional resource reservation reserving an additional reserved resource separated in time from the second resource by a second time gap shorter than the first time gap based at least in part on the deactivated first mode.

Example 10: The method of any of examples 1 through 9, wherein the first mode comprises a high pathloss mode.

Example 11: The method of any of examples 1 through 10, wherein the control message indicates an acknowledgment resource for receiving the acknowledgment message.

Example 12: An apparatus comprising at least one means for performing a method of any of examples 1 to 11.

Example 13: An apparatus for wireless communications comprising: a processor; memory coupled with the processor; the processor and memory configured to perform a method of any of examples 1 to 11.

Example 14: A non-transitory computer-readable medium storing code for wireless communications, the code comprising instructions executable by a processor to perform a method of any of examples 1 to 11.

Example 15: A method for wireless communications at a first wireless device, comprising: receiving, from a second wireless device, a control message on a physical downlink control channel, wherein the control message comprises a resource reservation for communication with the second wireless device; transmitting, to the second wireless device, an acknowledgment message on a physical uplink control channel, wherein the acknowledgment message acknowledges successful reception of the resource reservation at the first wireless device; and communicating with the second wireless device based at least in part on the resource reservation.

Example 16: The method of example 15, wherein the resource reservation reserves a downlink resource on a physical downlink shared channel, the method further comprising: receiving, from the second wireless device, a data message in the reserved downlink resource on the physical downlink shared channel.

Example 17: The method of examples 15 or 16, wherein the resource reservation reserves an uplink resource on a physical uplink shared channel, the method further comprising: transmitting, to the second wireless device, a data message in the reserved uplink resource on the physical uplink shared channel.

Example 18: The method of any of examples 15 through 17, further comprising: identifying that a first mode is activated, wherein the transmitting the acknowledgment message is based at least in part on the activated first mode.

Example 19: The method of any of examples 15 through 18, further comprising: deactivating the first mode based at least in part on a measurement; receiving, from the second wireless device, an additional control message on the physical downlink control channel, wherein the additional control message comprises an additional resource reservation for communication with the second wireless device; and communicating with the second wireless device based at least in part on the additional resource reservation.

Example 20: The method of any of examples 15 through 19, wherein the first mode comprises a high pathloss mode.

Example 21: The method of any of examples 15 through 20, wherein the transmitting the acknowledgment message comprises: transmitting the acknowledgment message in an acknowledgment resource subsequent to a first resource in which the control message is received and prior to a reserved resource corresponding to the resource reservation.

Example 22: The method of any of examples 15 through 21, further comprising: determining the acknowledgment resource based at least in part on the first resource in which the control message is received or the reserved resource corresponding to the resource reservation or both.

Example 23: The method of any of examples 15 through 22, further comprising: determining the acknowledgment resource based at least in part on an acknowledgment resource allocation in the control message Example 24: An apparatus comprising at least one means for performing a method of any of examples 15 to 23.

Example 25: An apparatus for wireless communications comprising: a processor; memory coupled with the processor; the processor and memory configured to perform a method of any of examples 15 to 23.

Example 26: A non-transitory computer-readable medium storing code for wireless communications, the code comprising instructions executable by a processor to perform a method of any of examples 15 to 23.

It should be noted that the methods described herein describe possible implementations, and that the operations may be rearranged or otherwise modified and that other implementations are possible. Further, aspects from two or more of the methods may be combined.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers. A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary function that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a first wireless device, comprising:
   one or more memories; and
   one or more processors coupled with the one or more memories, the one or more processors configured to cause the first wireless device to:
   transmit, a control message that indicates a resource reservation for communication with a second wireless device;
   monitor an uplink control channel for an acknowledgment message based at least in part on the control message, wherein the acknowledgment message acknowledges successful reception of the resource reservation at the second wireless device; and
   communicate a data message with the second wireless device based at least in part on the resource reservation, the data message associated with the control message.

2. The apparatus of claim 1, wherein an absence of the acknowledgment message is detected within a monitoring window based at least in part on the monitoring.

3. The apparatus of claim 2, wherein, to communicate, the one or more processors are configured to cause the first wireless device to:
   transmit a second control message based at least in part on the absence of the acknowledgment message, wherein the second control message comprises a second resource reservation for communication with the second wireless device.

4. The apparatus of claim 1, wherein the resource reservation reserves a downlink resource of a physical downlink shared channel, and wherein:
   to monitor for the acknowledgment message, the one or more processors are configured to cause the first wireless device to receive the acknowledgment message in response to the control message; and to communicate, the one or more processors are configured to cause the first wireless device to transmit the data message using the reserved downlink resource via the physical downlink shared channel.

5. The apparatus of claim 1, wherein the resource reservation reserves an uplink resource of a physical uplink shared channel, and wherein:

to monitor for the acknowledgment message, the one or more processors are configured to cause the first wireless device to receive the acknowledgment message in response to the control message based at least in part on the monitoring; and to communicate, the one or more processors are configured to cause the first wireless device to receive the data message using the reserved uplink resource of the physical uplink shared channel.

6. The apparatus of claim 1, wherein, to monitor, the one or more processors are configured to cause the first wireless device to:

monitor for the acknowledgment message in a monitoring window between a first resource in which the control message is transmitted and a reserved resource corresponding to the resource reservation.

7. The apparatus of claim 6, wherein a starting point of the monitoring window, an ending point of the monitoring window, or both are based at least in part on a configuration of the first wireless device.

8. The apparatus of claim 1, wherein the one or more processors are further configured to cause the first wireless device to:

activate a first pathloss mode, wherein to monitor, the one or more processors are configured to cause the first wireless device to:

monitor based at least in part on the activation of the first pathloss mode.

9. The apparatus of claim 8, wherein the control message is separated in time from the resource reservation by a first time gap, and the one or more processors are further configured to cause the first wireless device to:

deactivate the first pathloss mode based at least in part on a pathloss measurement; and transmit a second control message, wherein the second control message comprises a second resource reservation reserving a second reserved resource separated in time from the second resource by a second time gap based at least in part on the deactivated first pathloss mode.

10. The apparatus of claim 8, wherein the first pathloss mode comprises a high pathloss mode.

11. The apparatus of claim 1, wherein the control message indicates an acknowledgment resource for monitoring for the acknowledgment message.

12. An apparatus for wireless communications at a first wireless device, comprising:

one or more memories; and one or more processors coupled with the one or more memories, the one or more processors configured to cause the first wireless device to:

receive a control message that indicates a resource reservation for communication with a second wireless device;

transmit an acknowledgment message on an uplink control channel, wherein the acknowledgment message acknowledges successful reception of the resource reservation at the first wireless device; and communicate a data message with the second wireless device based at least in part on the resource reservation, the data message associated with the control message.

13. The apparatus of claim 12, wherein the resource reservation reserves a downlink resource of a physical downlink shared channel, and wherein:

to communicate, the one or more processors are configured to cause the first wireless device to receive the data message using the reserved downlink resource via the physical downlink shared channel.

14. The apparatus of claim 12, wherein the resource reservation reserves an uplink resource of a physical uplink shared channel, and wherein:

to communicate, the one or more processors are configured to cause the first wireless device to transmit the data message using the reserved uplink resource via the physical uplink shared channel.

15. The apparatus of claim 12, wherein the one or more processors are further configured to cause the first wireless device to:

activate a first pathloss mode, wherein the acknowledgment message is transmitted based at least in part on the activation of the first pathloss mode.

16. The apparatus of claim 15, wherein the one or more processors are further configured to cause the first wireless device to:

deactivate the first pathloss mode based at least in part on a pathloss measurement;

receive a second control message, wherein the second control message comprises a second resource reservation for communication with the second wireless device; and communicate with the second wireless device based at least in part on the second resource reservation.

17. The apparatus of claim 15, wherein the first pathloss mode comprises a high pathloss mode.

18. The apparatus of claim 12, wherein, to transmit the acknowledgment message, the one or more processors are configured to cause the first wireless device to:

transmit the acknowledgment message using an acknowledgment resource subsequent to a first resource via which the control message is received and before a reserved resource corresponding to the resource reservation.

19. The apparatus of claim 18, wherein the acknowledgment resource is based at least in part on the first resource via which the control message is received, the reserved resource corresponding to the resource reservation, or both.

20. The apparatus of claim 18, wherein the acknowledgment resource is based at least in part on an acknowledgment resource allocation indicated by the control message.

21. A method for wireless communications at a first wireless device, comprising:

transmitting a control message indicating a resource reservation for communication with a second wireless device;

monitoring an uplink control channel for an acknowledgment message based at least in part on transmitting the control message, the acknowledgment message acknowledging successful reception of the resource reservation at the second wireless device; and communicating a data message with the second wireless device based at least in part on the resource reservation, the data message associated with the control message.

22. The method of claim 21, wherein an absence of the acknowledgment message is detected within a monitoring window based at least in part on the monitoring.

23. The method of claim 22, wherein the communicating comprises:
transmitting a second control message based at least in part on the absence of the acknowledgment message, wherein the second control message comprises a second resource reservation for communication with the second wireless device.

24. The method of claim 21, wherein the resource reservation reserves a downlink resource of a physical downlink shared channel, and wherein:
the monitoring for the acknowledgment message comprises receiving the acknowledgment message in response to the control message; and
the communicating comprises transmitting the data message using the reserved downlink resource via the physical downlink shared channel.

25. The method of claim 21, wherein the resource reservation reserves an uplink resource of a physical uplink shared channel, and wherein:
the monitoring for the acknowledgment message comprises receiving the acknowledgment message in response to the control message based at least in part on the monitoring; and
the communicating comprises receiving the data message using the reserved uplink resource of the physical uplink shared channel.

26. The method of claim 21, wherein the monitoring comprises:
monitoring for the acknowledgment message in a monitoring window between a first resource in which the control message is transmitted and a reserved resource corresponding to the resource reservation.

27. A method for wireless communications at a first wireless device, comprising:
receiving a control message indicating a resource reservation for communication with a second wireless device;
transmitting an acknowledgment message on an uplink control channel, the acknowledgment message acknowledging successful reception of the resource reservation at the first wireless device; and
communicating a data message with the second wireless device based at least in part on the resource reservation, the data message being associated with the control message.

28. The method of claim 27, wherein the resource reservation reserves a downlink resource of a physical downlink shared channel, and wherein the communicating comprises:
receiving the data message using the reserved downlink resource via the physical downlink shared channel.

29. The method of claim 27, wherein the resource reservation reserves an uplink resource of a physical uplink shared channel, and wherein the communicating comprises:
transmitting the data message using the reserved uplink resource via the physical uplink shared channel.

30. The method of claim 27, further comprising: activating a first pathloss mode, wherein the acknowledgment message is transmitted based at least in part on activating the first pathloss mode.

31. The apparatus of claim 1, wherein the first wireless device and the second wireless device are Integrated Access and Backhaul (IAB) nodes in an IAB network.

32. The apparatus of claim 12, wherein the first wireless device and the second wireless device are Integrated Access and Backhaul (IAB) nodes in an IAB network.

33. A non-transitory computer-readable medium storing code for wireless communications at a first wireless device, the code comprising instructions executable by one or more processors to:
transmit a control message indicating a resource reservation for communication with a second wireless device;
monitor an uplink control channel for an acknowledgment message based at least in part on the control message, wherein the acknowledgment message acknowledges successful reception of the resource reservation at the second wireless device; and
communicate a data message with the second wireless device based at least in part on the resource reservation, the data message associated with the control message.

34. A non-transitory computer-readable medium storing code for wireless communications at a first wireless device, the code comprising instructions executable by one or more processors to:
receive a control message indicating a resource reservation for communication with a second wireless device;
transmit an acknowledgment message on an uplink control channel, wherein the acknowledgment message acknowledges successful reception of the resource reservation at the first wireless device; and
communicate a data message with the second wireless device based at least in part on the resource reservation, the data message associated with the control message.

\* \* \* \* \*